United States Patent [19]

Easki et al.

[11] Patent Number: 5,440,547
[45] Date of Patent: Aug. 8, 1995

[54] DATA-TRANSFER ROUTING MANAGEMENT FOR PACKET-ORIENTED DIGITAL COMMUNICATION SYSTEM INCLUDING ATM NETWORKS

[75] Inventors: Hiroshi Easki; Shigeyasu Natsubori, both of Yokohama; Takeshi Saito, Tokyo; Yoshiyuki Tsuda, Kawasaki; Shigeo Matsuzawa, Tokyo, all of Japan

[73] Assignee: Kabushiki Kaisha Toshiba, Kawasaki, Japan

[21] Appl. No.: 177,547

[22] Filed: Jan. 5, 1994

[30] Foreign Application Priority Data

Jan. 7, 1993 [JP] Japan ............................. 5-001267
Mar. 12, 1993 [JP] Japan ............................. 5-079112
Sep. 14, 1993 [JP] Japan ............................. 5-229241

[51] Int. Cl.$^6$ ............................................. H04L 12/56
[52] U.S. Cl. ................................ 370/60; 370/60.1; 370/94.1
[58] Field of Search .................. 370/60, 60.1, 68,1, 370/85.13, 85.14, 94.1, 94.2, 110-111, 54

[56] References Cited

U.S. PATENT DOCUMENTS 5,163,045  11/1992  Caram et al. ..................... 370/60.1
5,291,483  3/1994   Nagai et al. ...................... 370/60

Primary Examiner—Melvin Marcelo
Attorney, Agent, or Firm—Oblon, Spivak, McClelland, Maier & Neustadt

[57] ABSTRACT

An asynchronous transfer mode (ATM) network includes a plurality of data links interconnecting a plurality of data exchange nodes, and a plurality of data terminals connected by data links associated therewith to the data exchange nodes in the ATM network. In the ATM network, a virtual circuit is selectively established over which a series of data packets including one or a plurality of coded cells is routed from a source terminal toward a destination terminal. Each of these cells includes an information field and a header section. The terminals are assigned with identification parameters respectively, which parameters are uniform in value within the network. When a cell is transferred from the source terminal to the destination terminal along a presently determined route including selected links associated with certain data exchange node or nodes, a specific identification parameter being assigned to the destination terminal is written into the header section of the cell. This cell is then transferred toward the destination terminal on the basis of the specific identification parameter without causing this parameter to be written or converted at the certain data exchange node or nodes in the presently determined route.

19 Claims, 22 Drawing Sheets

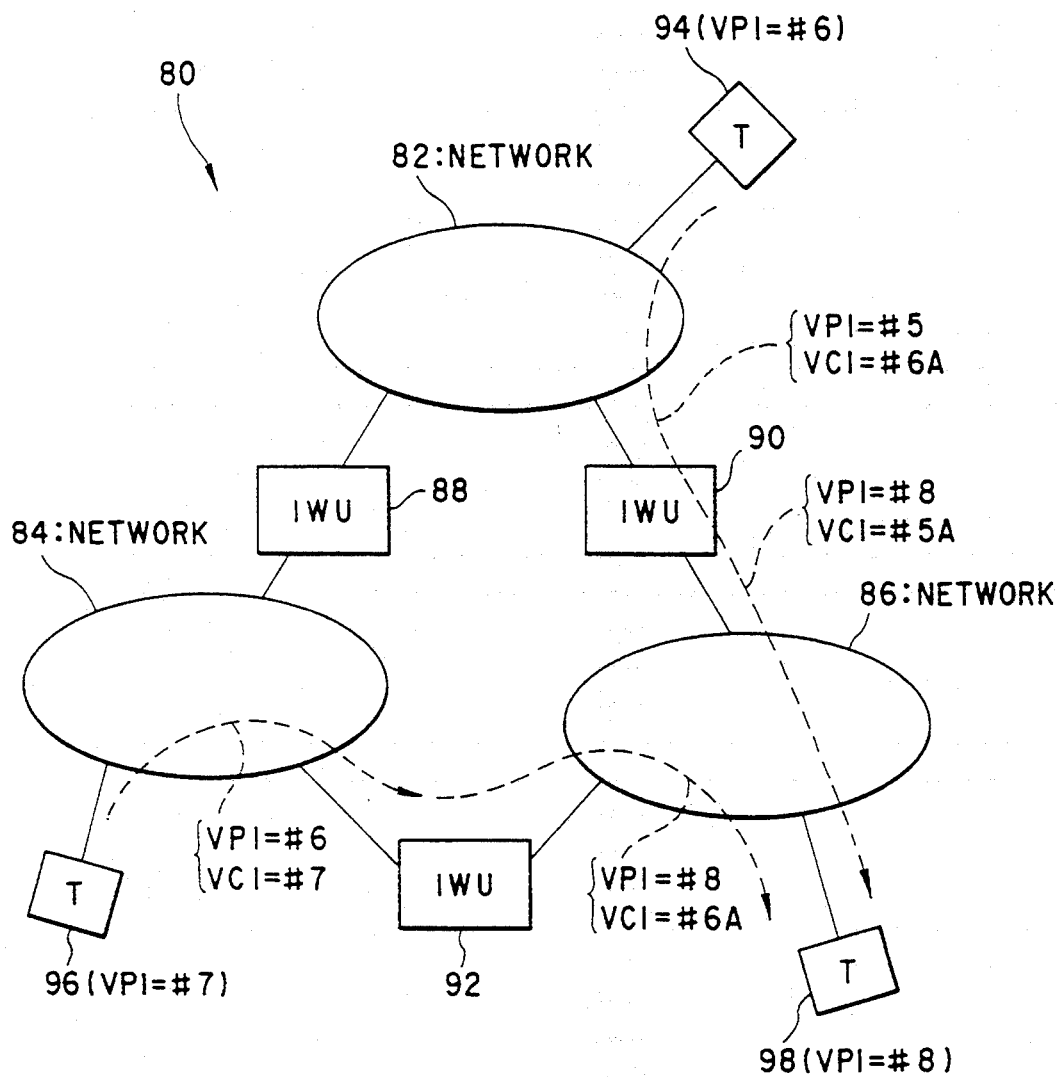
F I G. 5

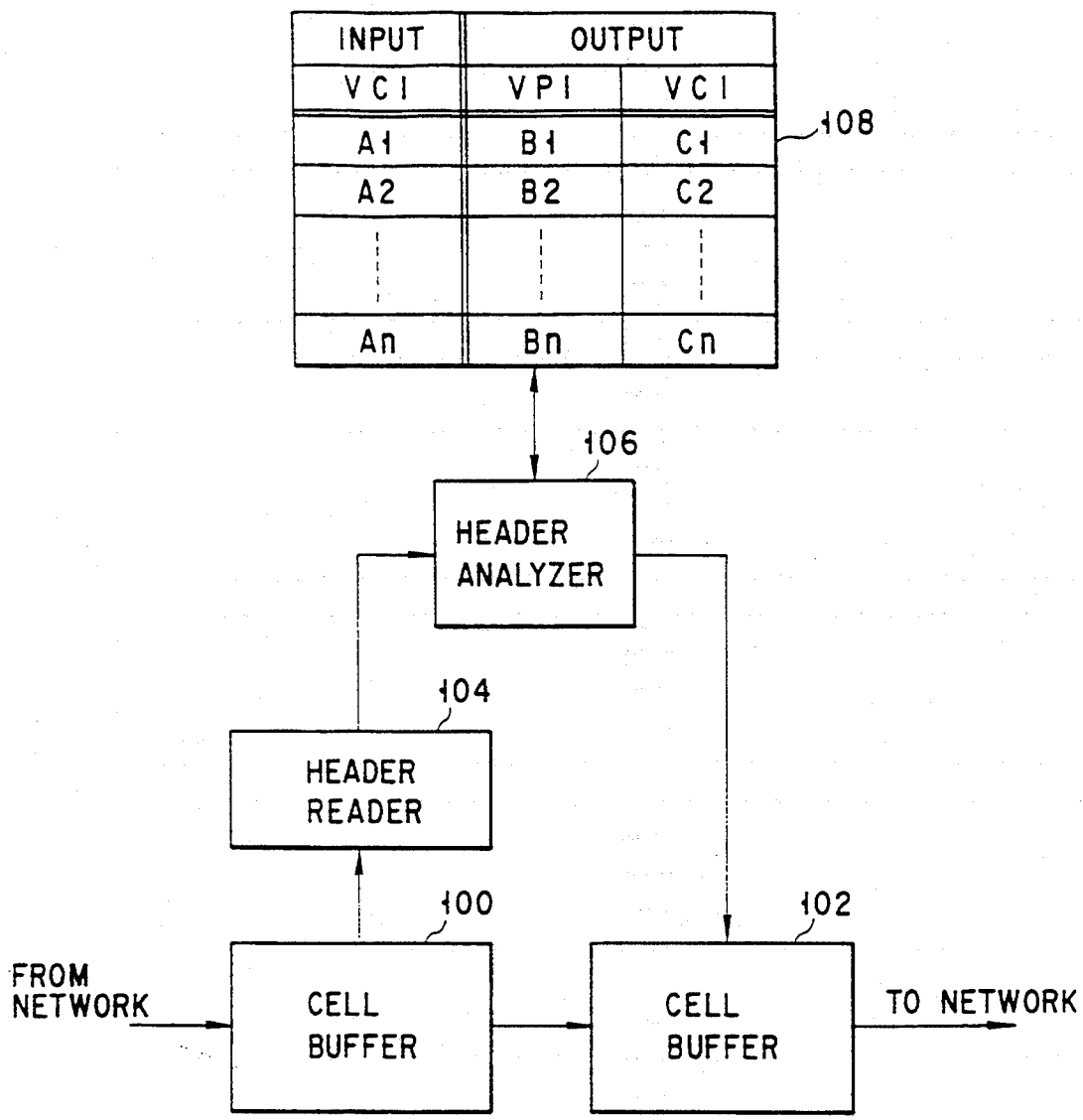
F I G. 6

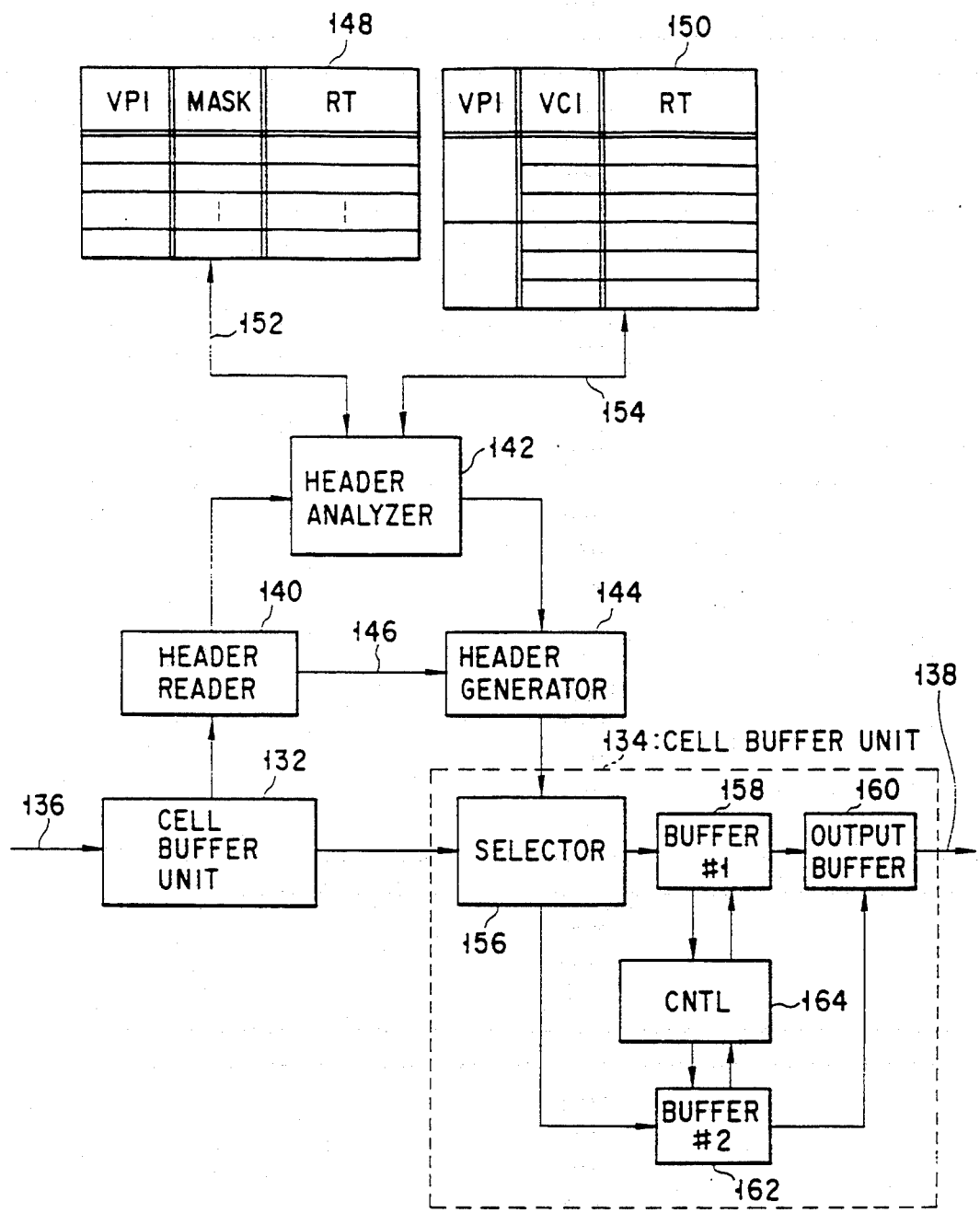
F I G. 8

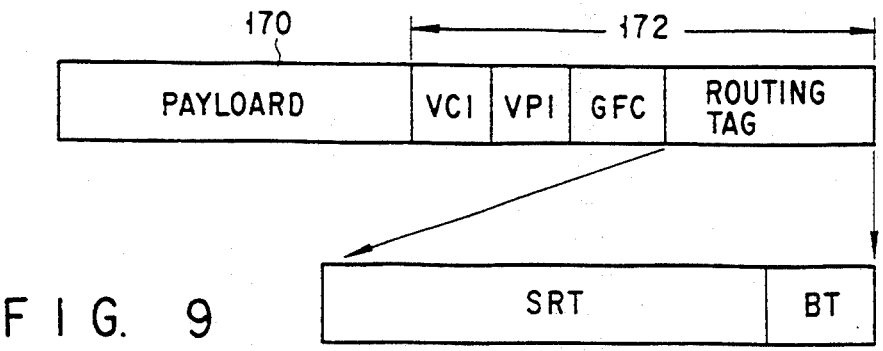
F I G. 9
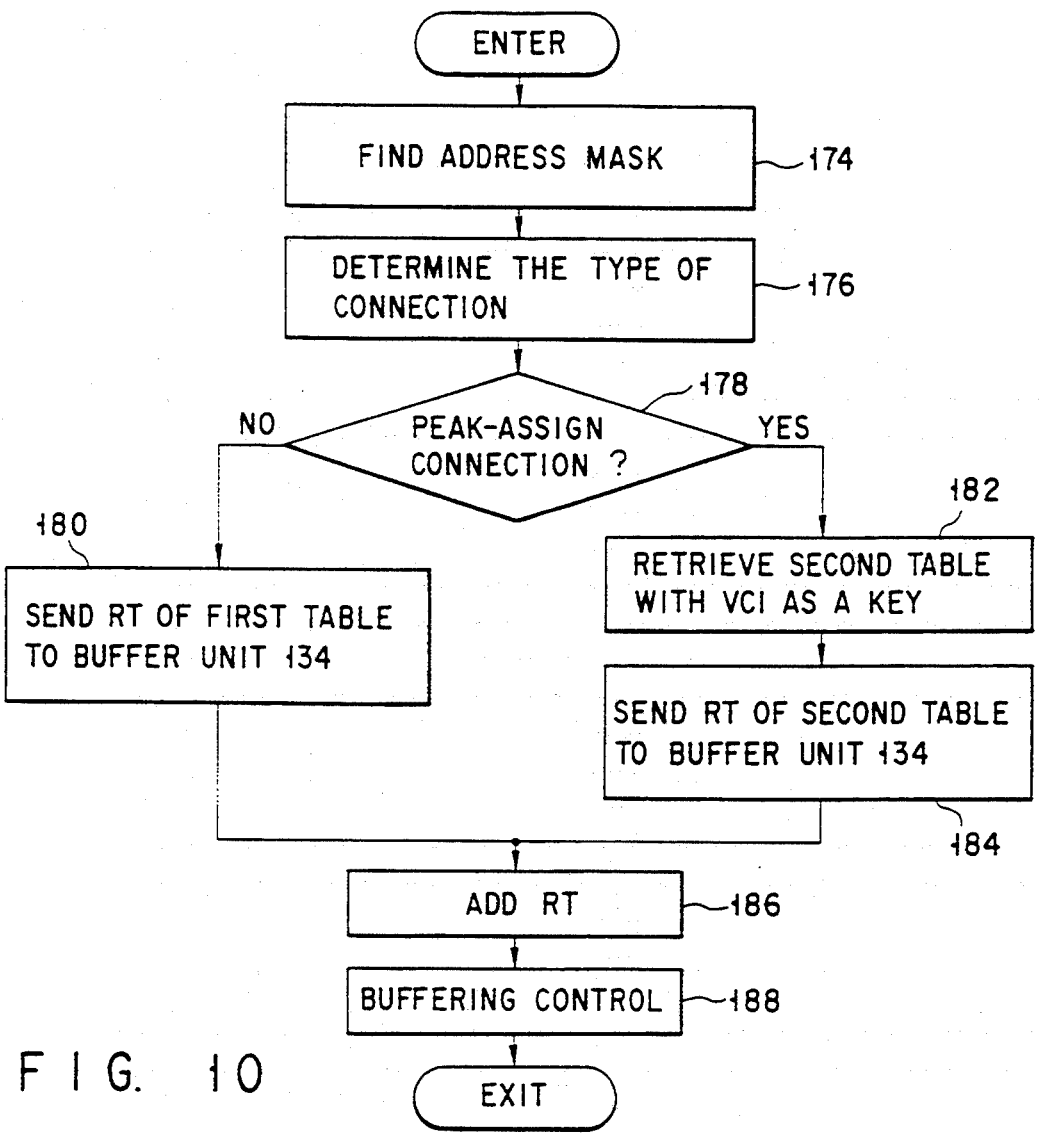
F I G. 10

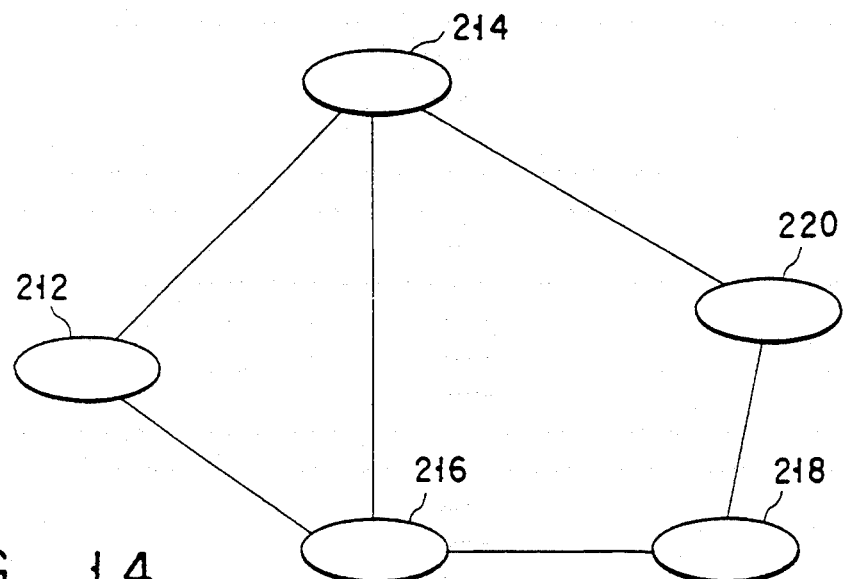
FIG. 14
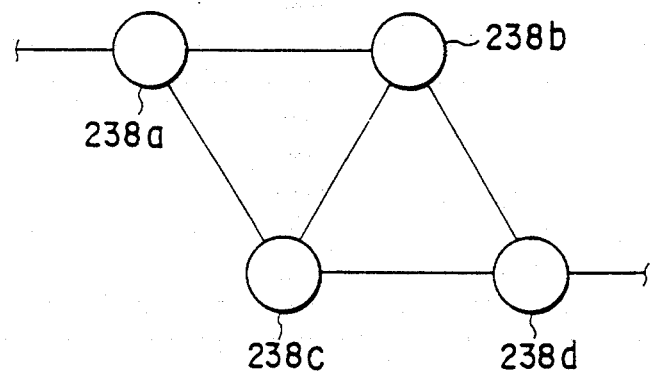
FIG. 15
| VPI | LOGIC ADDRESS |
|-----|---------------|
|     |               |
|     |               |
|  ⋮  |       ⋮       |
|     |               |
FIG. 16

| VPI | VCI | SOURCE LOGIC ADDRESS | DESTINATION LOGIC ADDRESS |
|---|---|---|---|
| | | | |
| | | | |
| | | | |
| ⋮ | ⋮ | ⋮ | ⋮ |
| | | | |
F I G. 17 PRIOR ART
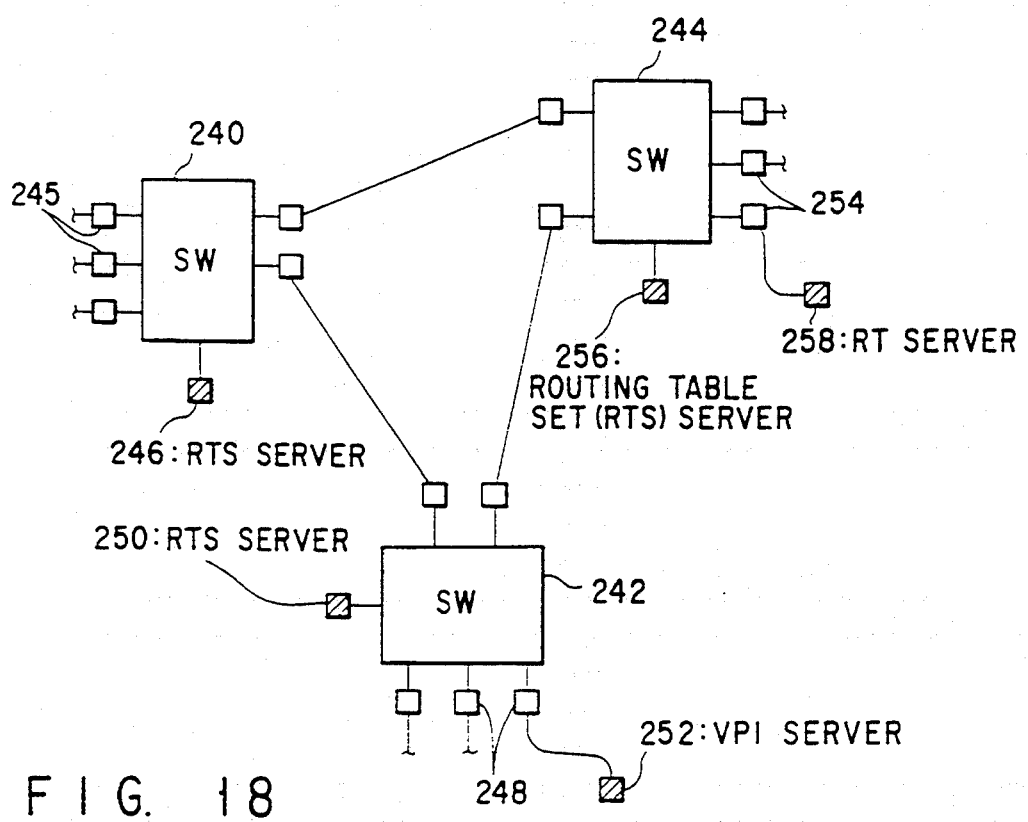
F I G. 18

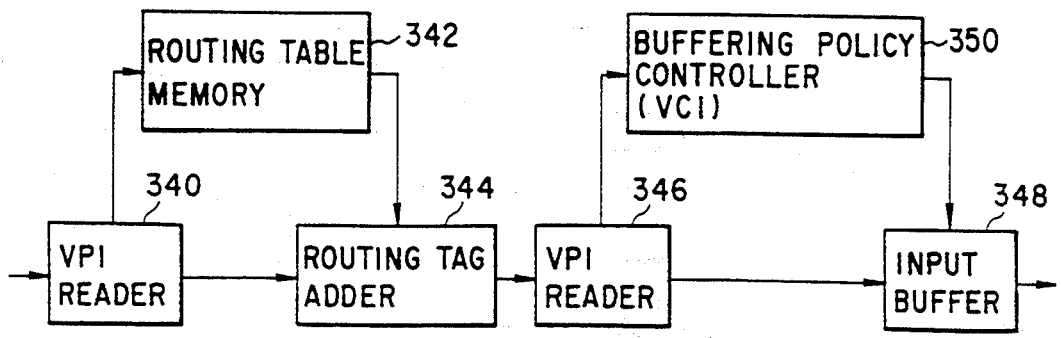
F I G. 25
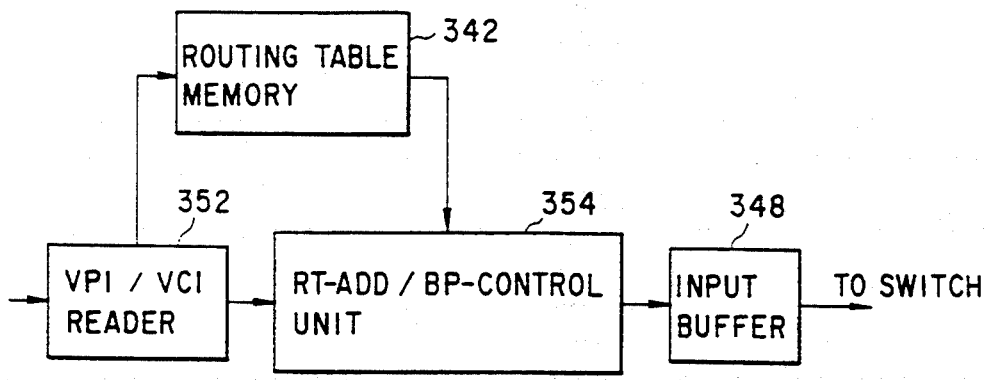
F I G. 26
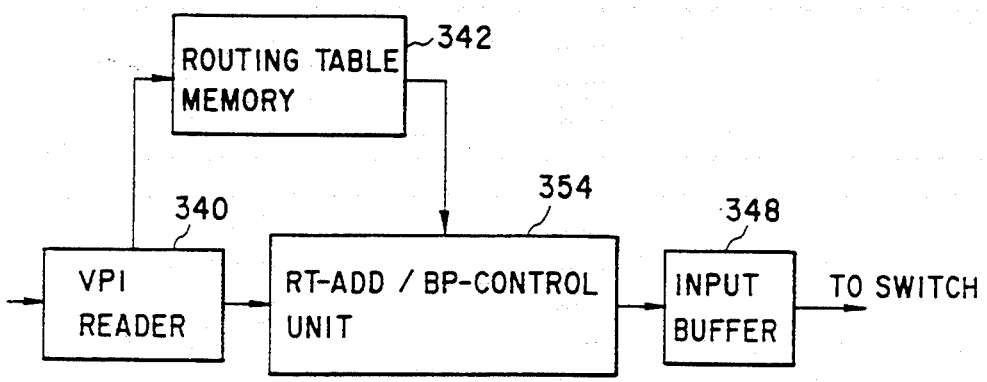
F I G. 29

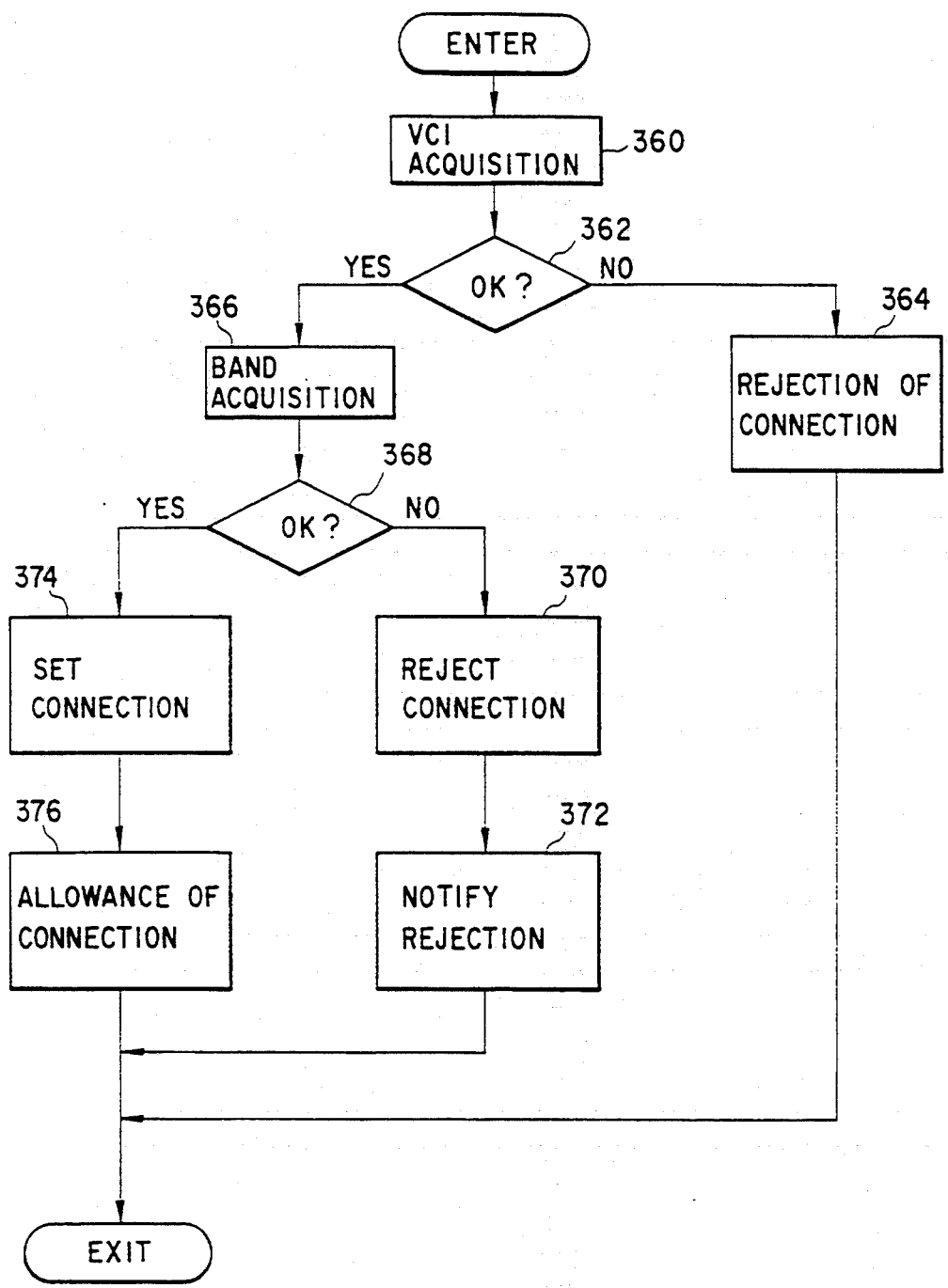
F I G. 27

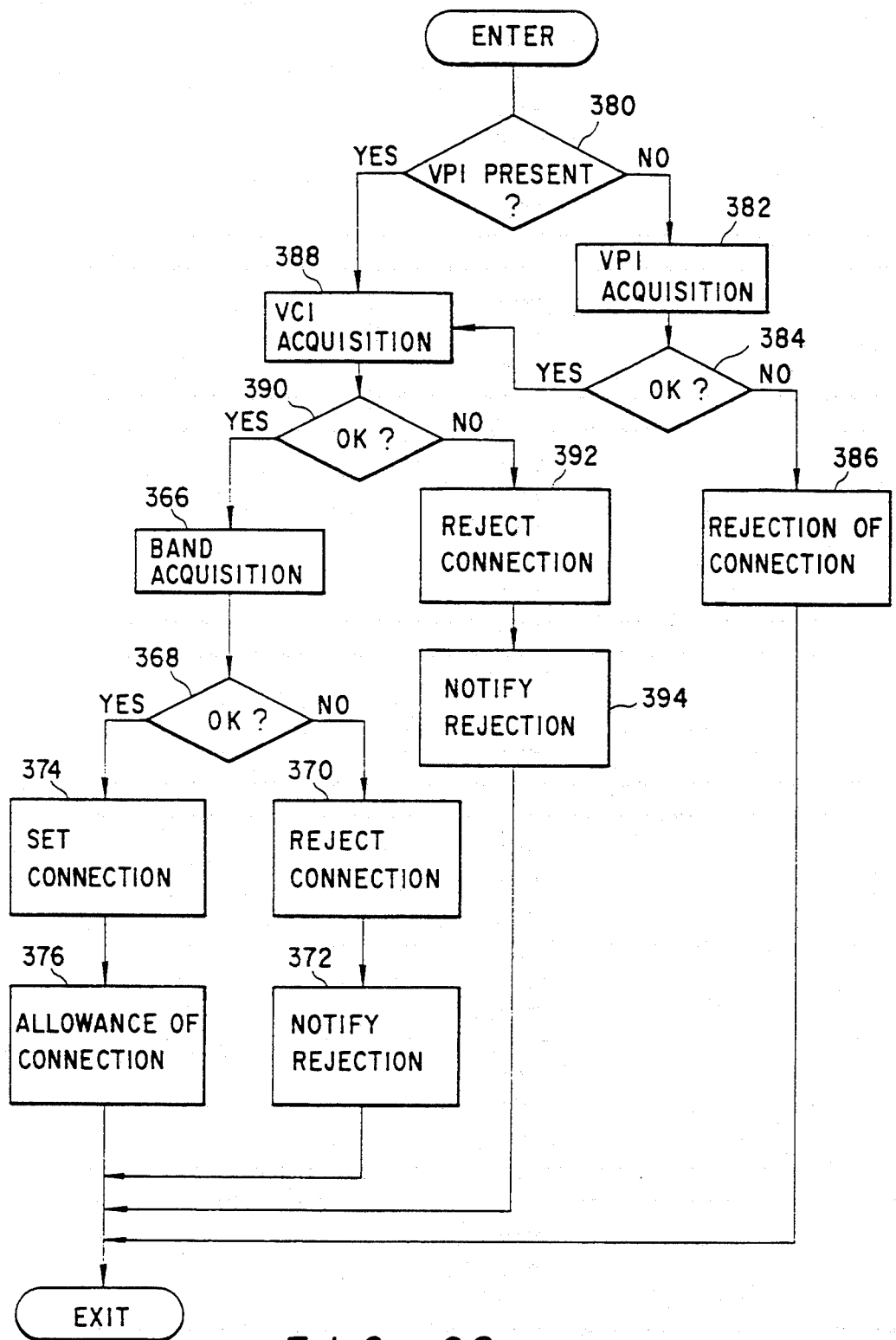
F I G. 28

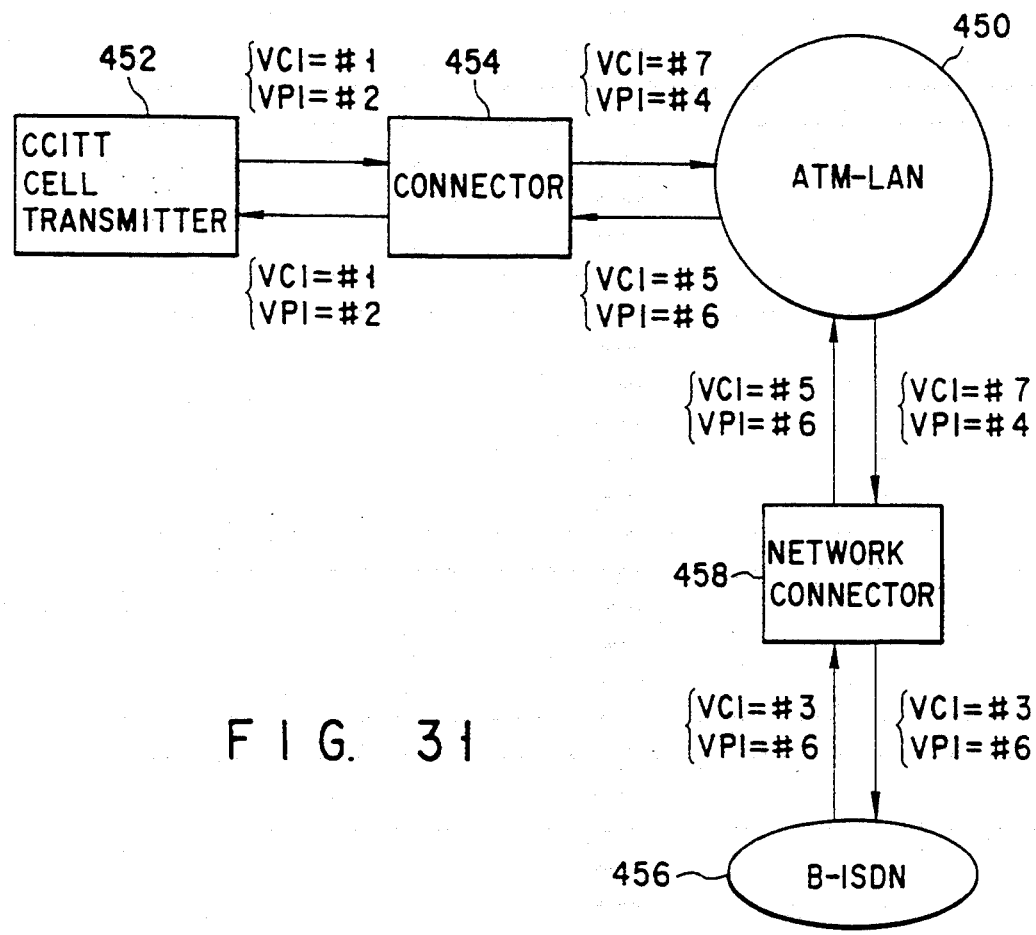
F I G. 31
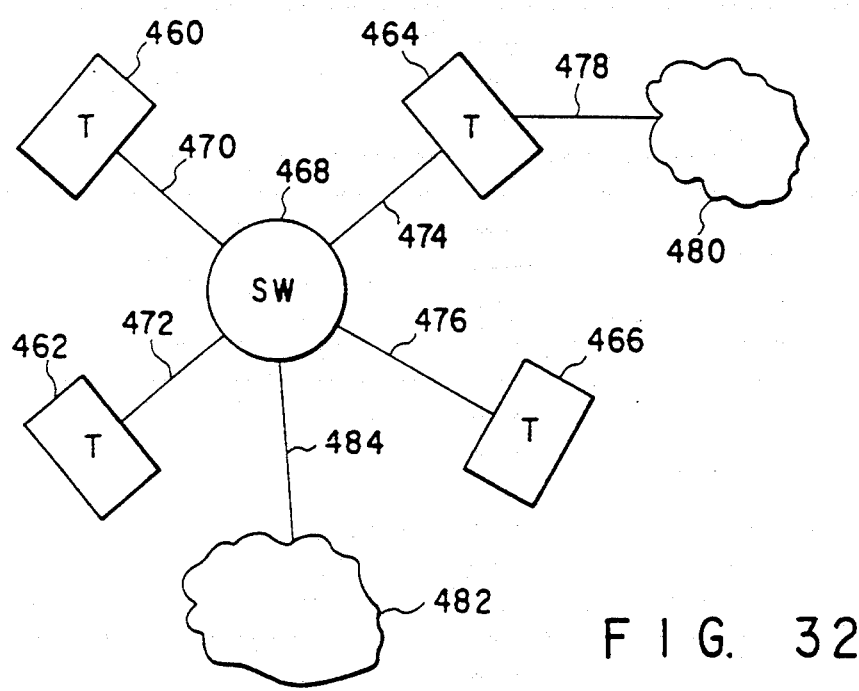
F I G. 32

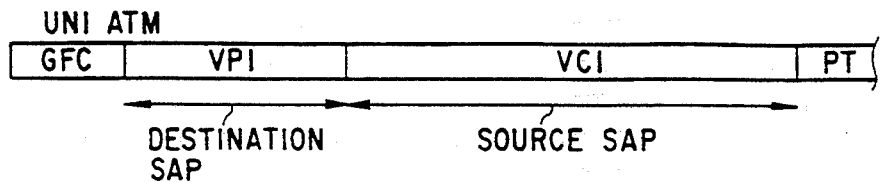
F I G. 33A
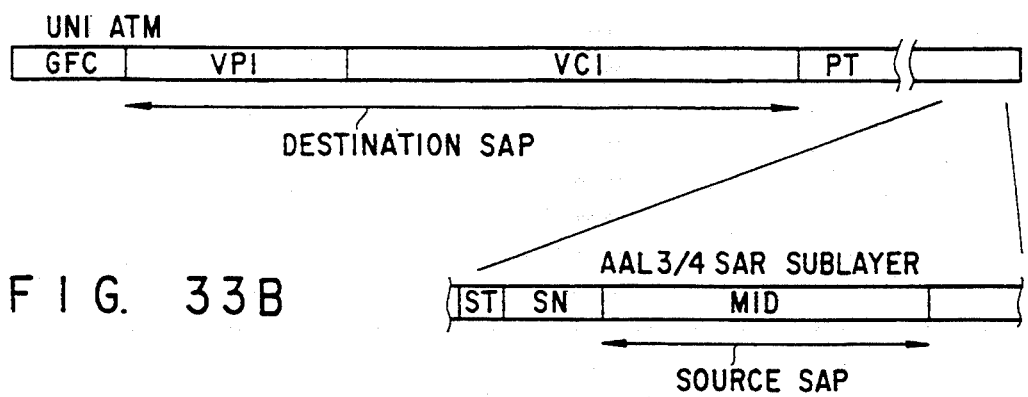
F I G. 33B
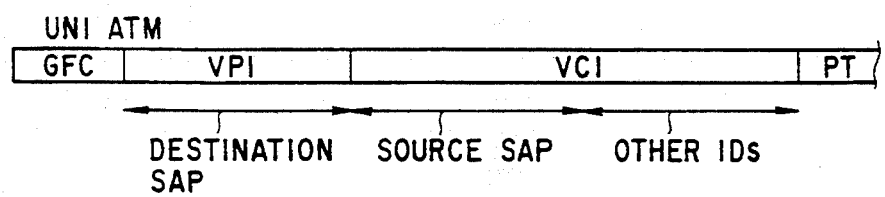
F I G. 33C
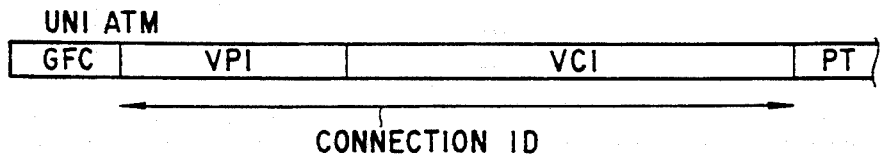
F I G. 33D
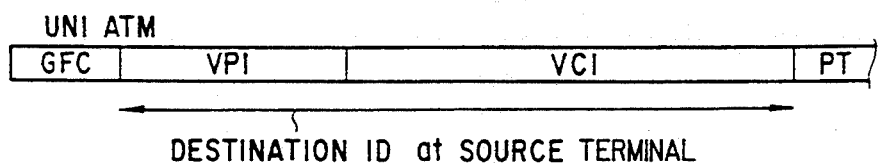
F I G. 33E

DATA-TRANSFER ROUTING MANAGEMENT FOR PACKET-ORIENTED DIGITAL COMMUNICATION SYSTEM INCLUDING ATM NETWORKS

BACKGROUND OF THE INVENTION

1. Field of the Invention

The present invention relates in general to a high-speed digital data communication technology, and in more particular to broadband integrated services digital network (B-ISDN) systems wherein a plurality of data terminals such as work stations are capable of communicate with any one of the data terminals through data links associated therewith. The invention also relates to a connection-oriented local area network (LAN) employing an asynchronous data transfer mode.

2. Description of the Related Art

With the increasing needs for large transfer capacity and high speed transmission of digital data communication network systems (such as B-ISDN), the development of a more efficient data-transfer routing scheme for such network systems has been demanded strongly. In recent years, as one of the B-ISDN systems satisfying the requirements, attention is paid to a specific digital data network system that employs a specific packet-oriented data-transfer mode which uses asynchronous time division multiplexing techniques, which is called the "asynchronous transfer mode (ATM)". ATM is one of the most promising transfer modes implementing B-ISDN. A local area network using ATM is generally known as the "ATM-LAN" among those skilled in the art of digital data communication network systems.

The details of the data transmission principles in the ATM communication network system have been described in several recommendations as published by the international telegraph and telephone consultative committee (CCITT). Principally, the presently available ATM network includes data links for interconnecting a plurality of network switches. A plurality of terminals (such as work stations, personal computers, etc.) are connected to the network switches by way of links associated therewith. The links have an input port and an output port with respect to each terminal. When a certain terminal communicates with another terminal, the former may be called the "source terminal" or "sender", whereas the latter is called the "destination or target terminal" or "receiver". A routing for enabling the data transfer between them is selected and determined using identifier(s).

More specifically, with the ATM network, the multiplexed information flow to be communicated between the "sender" and "receiver" terminals is organized into a plurality of blocks or packets of fixed size, that is, packets. These packets are generally called the "cells" in the digital data communication network art. A cell consists of an information field called the "payload" and a header section. The information field stores therein information to be transferred; the header is arranged to store a variety of kinds of parameters required to perform the transfer of information. The information may be disassembled into a plurality of cells, each of which has a fixed length of 53 bytes, for example; in such circumstances, the information field is assigned with 48 bytes, while the header is assigned with 5 bytes. The parameters include a 8-bit or 12-bit virtual path identifier (VPI) and a 2-byte virtual channel identifier (VCI). The recommended cell header format and structure is disclosed, for example, in the international telegraph and telephone consultative committee (CCITT) integrated services digital network (ISDN), Recommendation I.361, "B-ISDN ATM Layer Specification", Geneva, 1991, at pp. 1-2 (FIGS. 1-2).

The primary role of the header is to identify certain cells that belong to the same virtual channel within the asynchronous time-division multiplex. The transfer capability may be assigned by negotiations, depending upon the source requirements and the available capacity. The network identifies a connection by making reference to the VCI and VPI. In other words, the connection for enabling the data transmission in the ATM network is supported by the contents of the cell header. In this respect, the ATM may also be regarded as a connection-oriented data-transmission technique.

In the existing ATM scheme, the cell header parameters such as VCI and VPI are unique or remain uniform with respect to only one of the switches or cell exchange nodes (which may also be called the physical interface point in some cases) internally arranged in the ATM network. The VCI/VPI parameters do never remain uniform in value throughout the entire network. It will unconditionally happen that the same VCI/VPI parameter values may coexist at different interface points within the ATM network. Looking at the ATM network as a whole, in case where data packets or cells are transferred from a sender toward a receiver in accordance with a presently selected connection routing in a session, the VCI/VPI parameters are converted or rewritten into different values every time such parameters pass through a different one of the cell exchange nodes included in the selected route in such a manner that a rewritten value of each parameter matches a data link associated with such node. At each cell exchange node, the transfer of an outgoing cell is carried out by searching for a routing table prestored therein with the VCI/VPI values of an incoming cell being as a key, and by adding to the cell a routing tag that is effective only at a corresponding cell exchange node. The routing table information for enabling the VCI/VPI "translation" and the addition of routing tag at each cell exchange node is written when respective connection is set in the ATM network. When the connection regarding the present session is terminated, a corresponding entry information will be deleted.

Another saying of this is that the prior art ATM network system employs the network node interface (NNI) scheme to interconnect network segments, which may be switch nodes or sub-networks included in the system. In the case of performing an ATM session, the terminal requests a connection setting to the network. Upon the receipt of the connection setting request, the network makes a communication reservation and determines a routing necessary to transfer packets of information (or cells) from the sender (or source terminal) to a receiver (or destination terminal). The VCI/VPI information indicative of the routing thus determined is notified to the terminal. Such VCI/VPI values are assigned to the respective switch nodes distinctly and independently. In principle, different VCI/VPI values are assigned to different nodes; in practice, assignment of identical values to different nodes may occur due to the "independency". Therefore, it should be necessary that, in data communications, the VCI/VPI values must be rewritten or converted to match each corresponding node every time the transfer cells pass through each of several nodes included in the determined routing.

It has been described that, with the ATM routing scheme, the values of VCI/VPI parameters given by the network to the switch nodes concerned are uniform only for respective interface points, i.e., data-exchange nodes (or switches). Therefore, VCI/VPI acquisition does not come without the settings of connection. The connection settings are attained by making use of a special purpose channel called a "metasignaling channel". The connection-setting procedure is performed by a connection setting server as part of the function assigned to the ATM network.

A problem of the "switch nodes dependent uniformity" arrangement of the VCI/VPI in the conventional ATM network is that the certainty and reliability of data communications may depend on the network connection setting server. Unfortunately, if the network connection setting server operates improperly (due to the occurrence of a failure, for example), all the communications in this network become unavailable. This is based on the fact that, in the prior art, the start of actual communication in each of all the communication sessions is impossible without the presence of intervening connection-setting procedure, and that, if the server malfunctions, the ATM network becomes in the communication impossible state as a whole.

Another problem of the conventional ATM network with the "nodes dependent VCI/VPI uniformity" arrangement is as follows: in a given session, when packet data is to be transferred from a source terminal to a destination terminal through cell exchange nodes selected in accordance with the presently determined routing, the VCI/VPI values must be converted every time they pass through each of such nodes. To achieve the rewrite function of the VCI/VPI values at every switch node, an internal memory of large capacity for storing a VCI/VPI conversion table and a logic circuitry therefor must be arranged in each node. The addition of such extra components complicates the network hardware in structure and causes an excessive increase in cost.

Still another problem of the prior-art ATM network with the "nodes dependent VCI/VPI uniformity" feature is that the system expandability and flexibility remain poor. More specifically, if a terminal is moved from a switch node presently connected therewith to another node in the ATM-LAN (such terminal movement may caused when a workstation computer is moved to another office within the same building), the VCI/VPI values assigned thereto become meaningless in a new destination after the movement was made. Simultaneously, the VCI/VPI values that have been owned by the destination node also become meaningless. It should be required that these VCI/VPI parameters are manually reassigned with different values by negotiation with the network due to the movement of the terminal. When viewed from the network side, this may result in a penalty which greatly decrease the expandability and flexibility inherent to the ATM.

SUMMARY OF THE INVENTION

It is therefore an object of the present invention to provide a new and improved addressing technique for a packet-oriented data-transfer mode communication network system.

It is another object of the invention to provide a new and improved packet-oriented data-transfer mode communication network system employing asynchronous time-division multiplexing techniques.

It is a further object of the invention to provide a new and improved asynchronous transfer mode local area network which can be excellent in the reliability, the flexibility and the expandability.

It is a still further object of the invention to provide a new and improved connection management technique for a high-speed asynchronous transfer mode local area network which can be excellent in the reliability, the flexibility and the expandability thereof, while having the manufacturing cost decreased.

In accordance with the above objects, the present invention is drawn to a specific data-communication network system, which includes an asynchronous transfer mode (ATM) network adapted to be associated with a plurality of data terminals, the ATM network is comprised of a plurality of data exchange nodes, and a plurality of data transfer links interconnecting the data exchange nodes so that the terminals are connected by corresponding data links associated therewith to the data exchange nodes in the network. A virtual circuit is selectively established in the ATM network to allow a series of data packets including one or a plurality of coded cells to be routed from at least one source terminal toward at least one destination terminal over the virtual circuit. Each of these cells includes an information field and a header section. The terminals are assigned with identification parameters respectively, each of which parameters is unique or uniform or unique in value inside the network. When a cell is transferred from the source terminal toward the destination terminal along a presently determined route including selected links associated with certain data exchange node or nodes, a specific identification parameter which has been assigned to the destination terminal is written into the header section of the cell. The cell is transferred to the destination terminal on the basis of the specific identification parameter without rewriting or converting the specific identification parameter at the certain data exchange node or nodes in the presently determined route.

The foregoing and other objects, features, and advantages of the invention will become apparent from the following more particular description of preferred embodiments of the invention, as illustrated in the accompanying drawings.

BRIEF DESCRIPTION OF THE DRAWINGS

FIG. 5 is a diagram showing an ATM network system including several networks in accordance with another embodiment of the invention.

FIG. 6 is a diagram showing the internal configuration of an inter working unit shown in FIG. 5.

FIG. 8 is a diagram showing the internal configuration of an inter-working unit of in FIG. 7.

FIG. 9 shows the format structure of a cell to be employed in the embodiment.

FIG. 10 is a flowchart for showing the routing information retrieval routing that is preferably implemented in the embodiment.

FIG. 14 shows the interconnection of the ATM-LANs of FIG. 13, and FIG. 15 shows the subnetworks of FIG. 13 independently of each other.

FIG. 16 shows the contents of a memory in a table format to be employed for the execution of an address analysis in the embodiment, and FIG. 17 shows a corresponding table information structure employed in the prior-art network system.

FIG. 18 shows a model of an ATM network system including data-exchange nodes each associated with data terminals and a server(s), which also embodying the invention.

FIG. 25 illustrates an exemplary hardware configuration of a circuit module that achieves the connection priority-control function shown in FIG. 24.

FIG. 26 shows a modification of the priority-control module of FIG. 25.

FIG. 27 is a flowchart diagram showing a connection-setting procedure for ATM network in accordance with a further embodiment of the invention.

FIG. 28 is a flowchart diagram showing another connection-setting procedure for ATM network also embodying the invention.

FIG. 29 is a block diagram showing an exemplary hardware configuration of a circuit module that achieves the connection setting function shown in FIG. 27.

FIG. 31 shows a network system including an ATM-LAN in accordance with a still further embodiment of the invention.

FIG. 32 shows another ATM-LAN system also embodying the invention.

FIGS. 33A to 33E show the cell format structures to be employed in the ATM-LAN of FIG. 32, respectively.

DETAILED DESCRIPTION OF THE PREFERRED EMBODIMENTS

Figure 1:
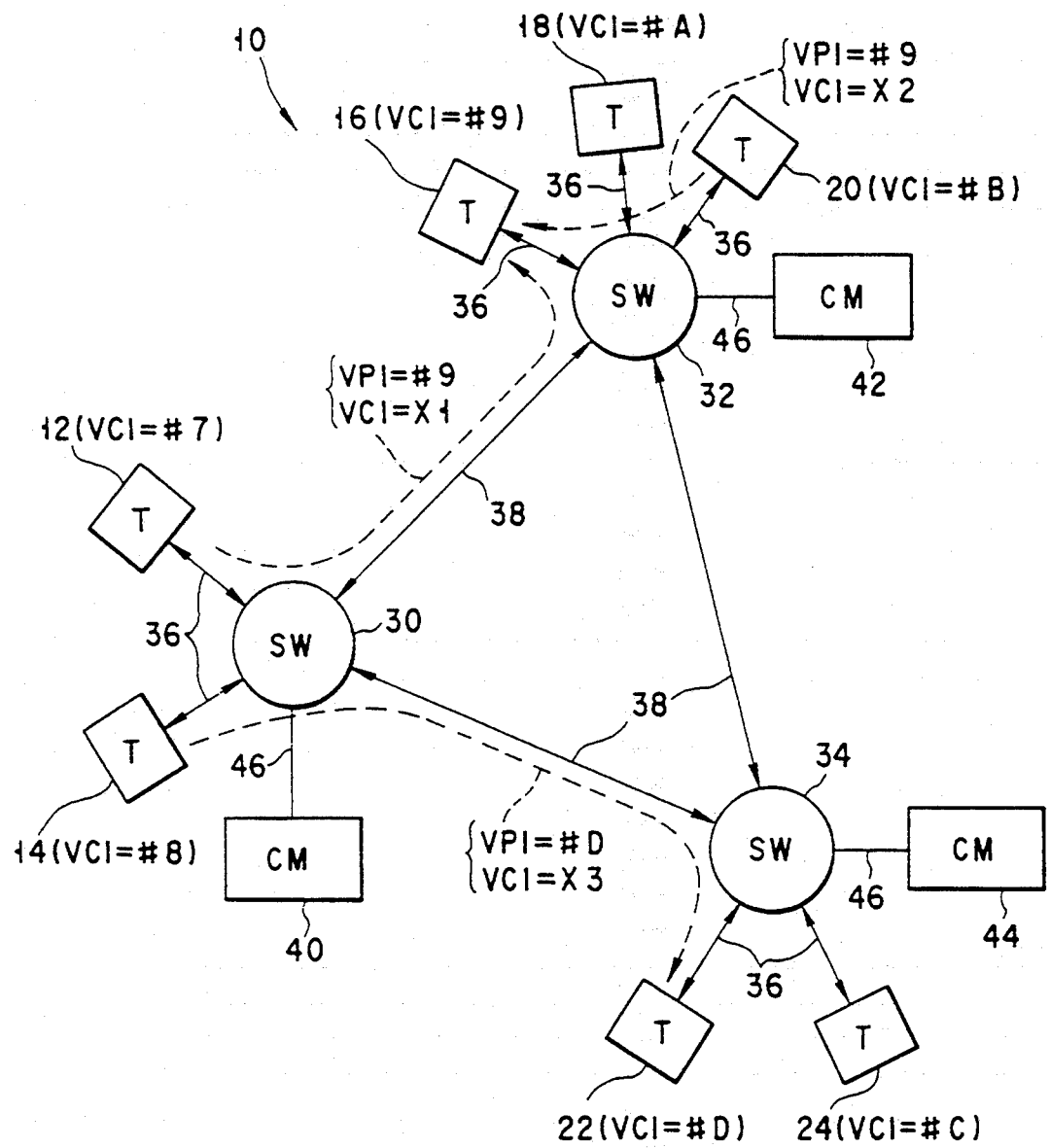
FIG. 1 is a diagram showing an asynchronous transfer mode local area network (ATM-LAN) in accordance with one preferred embodiment of the invention.

Referring now to FIG. 1, an asynchronous transfer mode local area network (ATM-LAN) system in accordance with one preferred embodiment of the invention is generally designated by the numeral 10. The ATM-LAN 10 includes a plurality of data terminals 12, 14, 16, 18, 20, 22 and 24, which may be work stations, personal computers, or the like. Each of these terminals 12-24 is adapted to receive and/or transmit data through ATM-LAN 10 to any other one of the remaining terminals.

As shown in FIG. 1, the data terminals 12-24 are associated with data-exchange nodes or switches 30, 32, 34, through which the data may be routed from a certain terminal (sender, transmitter or source terminal) to a target terminal (receiver or destination terminal). With the embodiment, terminals 12, 14 are interconnected to switch 30 by way of respective data transmission links 36. Similarly, terminals 16–20 are associated with switch 32 by links 36 respectively; terminals 22, 24 are interconnected with switch 34 through links 36 respectively. Switches 30-34 are connected with one another by way of a plurality of internal data links 38. Each switch 30, 32, 34 is provided with a corresponding one of control modules 40, 42, 44 being coupled thereto by a control line 46.

The individual of the terminals 12-24 is assigned with a specific parameter, that is, a virtual path identifier (VPI), which is a preselected number unique for it. Such parameter value is allocated when each terminal is first interconnected to the ATM-LAN 10 or every time it is booted. The VPI parameter is utilized as a routing information in the case of packet-oriented data transmission. The VPI parameter is written into a "header" field as defined in a user network interface (UNI) cell-format structure, as has been described in the introductory part of the description. Note that, the acquisition of VPIs may alternatively attained for a terminal by issuing a request toward the ATM-LAN.

The ATM-LAN 10 is specifically arranged so that it comes with a unique UNI-cell addressing technique that employs a specific VPI/VCI assignment scheme for the transmission of data in UNI cell format, as will be described below.

With the embodiment 10, unlike the conventional ATM network, the VPI parameters of the terminals 12 to 24 (which represent destination addresses) are uniform or unique for the ATM-LAN 10 in each session of data transfer. Employing such uniform VPI values makes it possible that, when data is transferred from the sender (or source terminal) to the receiver (destination terminal) through a selected route subjected to data transfer in the form of a UNI-cell(s), the values of the VCI and VPI parameters given to the data cells need not be rewritten or converted even if these parameters pass through respective switches included in the route. The dispensability of VCI/VPI rewriting in the switches in the selected route can (1) eliminate the addition of memory devices for storing conversion tables supposed to be prepared in advance in a conventional case, i.e., a Virtual Circuit Translation Table (VCXT) and a virtual Path Translation Table (VPXT) in these switches, and logic circuits required for these memory devices, and at the same time (2) dramatically simplify the ATM hardware including an increased number of switches as a whole.

The "uniform destination-identifier oriented addressing" routing technique of the invention will be described in further detail as follows. In the following description, consider an exemplary model wherein cell-data transfer is performed from the terminal 12 interconnected to the switch 30 in FIG. 1 to another terminal 16 associated with the switch 32. In this case, the terminal 12 is a source terminal, and the terminal 16 is a destination terminal. Assume that data are simultaneously transferred from other source terminals 14, 20 to the destination terminals 16, 22 in the ATM-LAN 10.

In the network, it is determined that data transfer from the source terminal 12 to the destination terminal 16 is performed through a route selected so as to include the switches 20, 32. At this time, the data cells are transferred through the link 36 interconnecting the terminal 12 to the switch 30, the link 38 connecting the switches 30, 32, and the link 36 interconnecting the switch 32 and the terminal 16, as indicated by a dotted line being illustrated for purposes of illustration only. As shown in FIG. 1, the VPI and VCI parameter values are not converted at the switches 30, 32 through which the data cells pass. In this session, the VPI and VCI values are maintained to be "#9" and "X1" through the links 36 and 38 concerned. In other words, the VPI/VCI parameters used in this case are uniform in the ATM-LAN 10.

Figure 2:
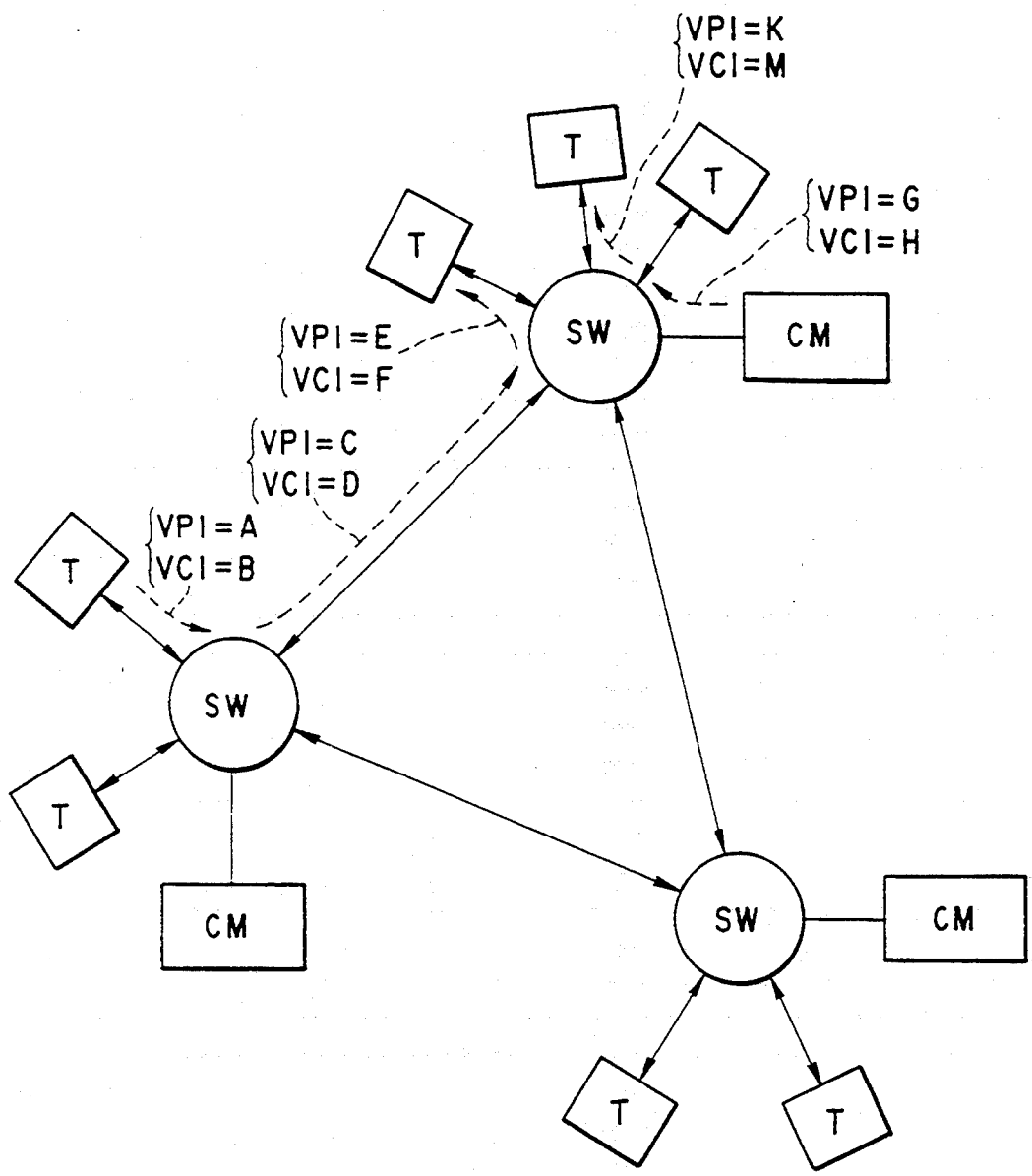
FIG. 2 shows a prior-art ATM-LAN that corresponds in structure to the embodiment of FIG. 1.

Similarly, the data transfer from the terminal 20 to the terminal 16 is uniform as VPI=#9 and VCI=X2 without any data rewrite operation on the selected ATM routing for this session, and the VPI and VCI values in the data transfer from the terminal 14 to the terminal 22 are fixed at "#D" and "X3". In the conventional ATM-LAN as a comparison, the VPI and VCI values are converted or rewritten in a session every time the data cells pass through each of the switches included in the selected route, as shown in FIG. 2.

In the example of FIG. 1, the source terminals 12, 20 have the terminal 16 as their common destination. Transfer of the data cells to the common destination terminal 16 is performed in a parallel or asynchronous manner. Transfer of cells in the ATM-LAN 10 is performed on the basis of the VPI values: each source terminal 12, 20 identifies the destination terminal 16 using the VCI values. In this example, VCI=X1 is a value for identifying the source terminal 12, and VCI=X2 is a value for identifying the source terminal 20.

Figure 3:
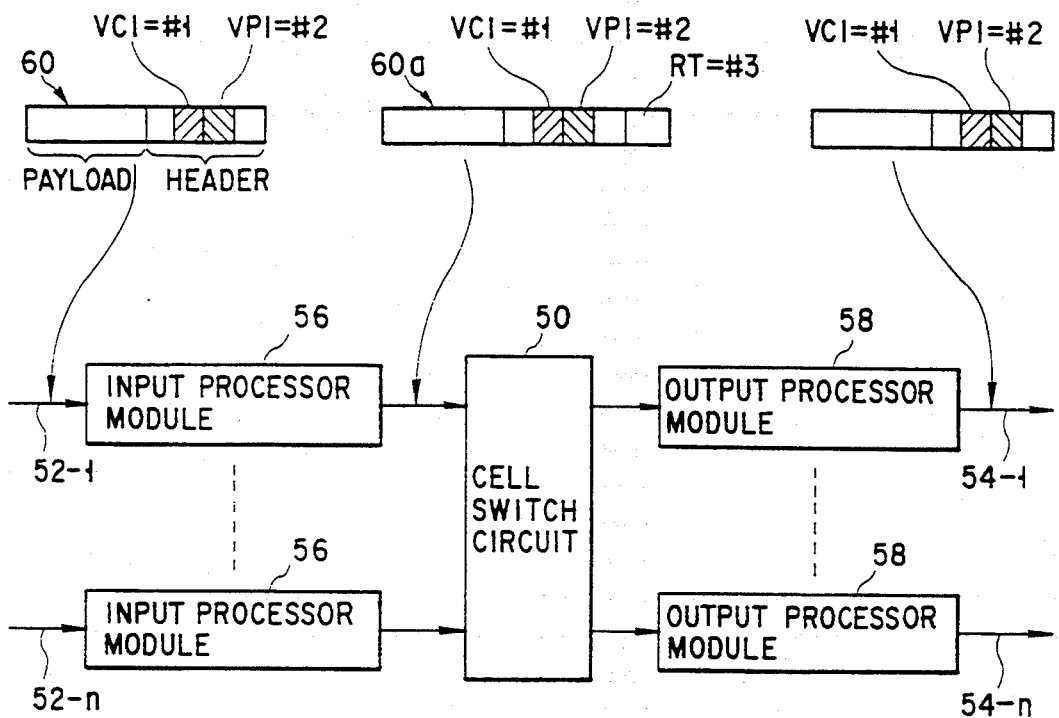
FIG. 3 is a diagram showing the internal arrangement of a data exchange node or switch included in the ATM-LAN of FIG. 1.

Each of the switch nodes 30, 32, 34 of FIG. 1 is arranged as shown in FIG. 3. Each switch node includes a cell switch circuit 50. This switch circuit 50 has inputs connected to a predetermined number of parallel incoming data ports 52-1, ..., 52-n and outputs connected to parallel outgoing ports 54-1, ..., 54-n being same in number as the ports 52. Input processing modules 56 are provided with the input ports 52, respectively. Output processing modules 58 are arranged at the output ports 54, respectively. Each input processor module 56 temporarily adds a specific parameter RT called a "routing tag" to a data cell 60 (which is a packet having the header field including the VPI and VCI parameters described above) incoming from a corresponding one of the input ports 52 to generate a cell 60a having this routing tag RT (=#3) in its header field, which is then fed to the cell switch circuit 50. The routing tag RT is required to locally perform the routing of data cells in the cell switch circuit 50. The cells routed in the switch circuit 50 appear at a suitably selected one of the output ports 54. The output processor module 58 associated with the port deletes the routing tag RT and sends the cell to a corresponding ATM link 38.

Figure 4:
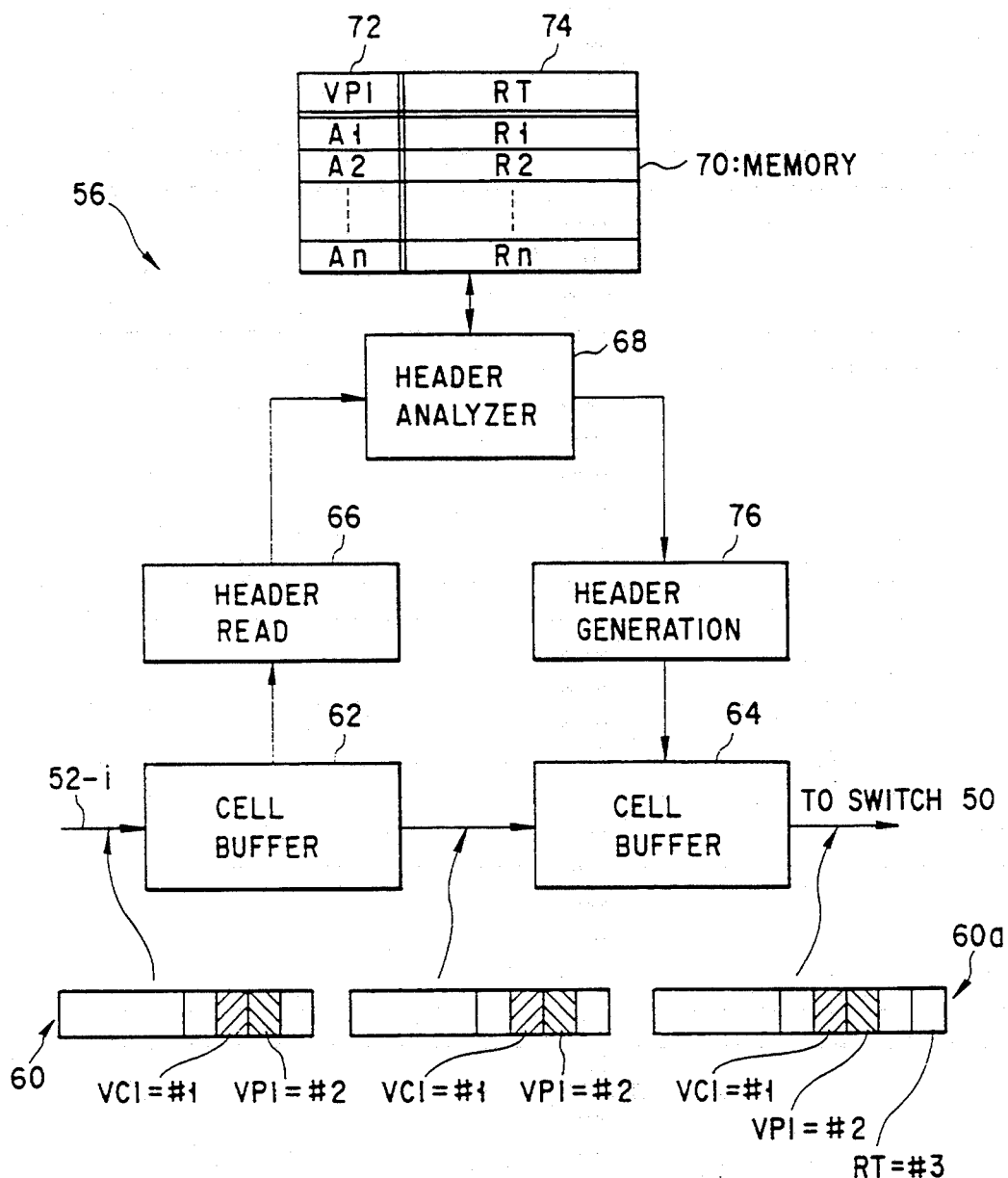
FIG. 4 is a diagram showing the internal configuration of an input processing module shown in FIG. 3.

Each of the input processing modules 56 of FIG. 3 may be arranged as shown in FIG. 4, wherein the module 56 includes a series of first and second cell-data buffer units 62, 64. The first buffer 62 has an input coupled to a corresponding input port 52-i (i=1, 2, ..., n). The output of second buffer 64 is connected to a corresponding one of the inputs of the cell switch circuit 50 of FIG. 3. First buffer is coupled with a header read section 66, which is connected in its output to a header information analyzer section 68. Analyzer 68 is associated with a memory device 70, which prestores therein a "VPI versus routing tag" table. Memory 70 comprises two fields 72, 74: the first field includes a list of VPI values, and the second field contains the corresponding values of routing tag RT in a one-to-one correspondence table format as illustrated in FIG. 4. Analyzer 68 has an output connected to a header generation unit 76, which is further connected at its output to the second cell buffer 64.

When a data cell 60 incomes over the input port 52-i, cell 60 is stored or "latched" in the first buffer 62. While cell 60 is being transferred to the second buffer 64, the header reader 66 reads the contents of header information of it, thereby to extract the value of VPI being presently written in header field of cell 60. The read results are then supplied to the header analyzer 68, which then determines a suitable routing-tag value, by accessing the contents of memory 70 with the VPI entry being as a key data so that a certain routing-tag value may be retrieved for an entry VPI being presently written in the header of data cell 60. Such retrieved RT value is fed by analyzer 68 to the header generator 76. Generator 76 then writes the RT value into the cell 60, which is now being stored in second buffer 64, whereby a data cell 60a with RT in its header field is obtained and transmitted to the cell switch circuitry 50 of FIG. 3. Note here that the entry number of the routing-tag table of memory 70 may be determined depending upon the length of field section of cell 60; typically, the maximum entry number is 256 in the case of UNI system, or is 4,096 in the case of NNI (network node interface) system. Such numbers are less than those in the prior-art network system, which requires a symbol number large enough to represent the contents in a 24-bit format (approximately $2 \times 10^7$).

An ATM network system 80 in accordance with another embodiment of the invention is shown in FIG. 5, wherein a plurality of networks 82, 84, 86 are interconnected with one another by network connectors 88, 90, 92, which may be called the "inter-working units (IWUs)" among those skilled in the art. Each network 82, 84, 86 includes a number of data terminals 94, 96, 98 linked together, although only one terminal is shown in FIG. 5 for purposes of illustration only.

In each of the networks 82–86 of FIG. 5, cell transfer and exchange are performed without rewriting the VCI and VPI parameters. In this sense, the VCI/VPI values are uniform in each network. When cell data is transferred from any one of the networks 82–86 to one of other networks, the VCI and VPI values are rewritten in the corresponding IWU. The VCI/VPI parameter values are converted in only the IWUs 88 to 92. The VCI parameter is appropriately managed to have the same connection as the VPI parameter but not to have the same value as the VPI parameter.

Each of the IWUs 88–92 of FIG. 5 may be arranged as shown in FIG. 6, wherein the IWU includes a series of data-cell buffer units 100, 102. The first cell buffer 100 has an input connected to a corresponding one of the networks 82, 84, 86 of FIG. 5. The second cell buffer 102 has an output connected to another network associated therewith. First buffer 100 is also connected to a header reader section 104, which is further connected to a header analyzer 106. These buffers 100, 102, header reader 104 and header analyzer 106 may be similar to those of FIG. 4 in configuration and function.

Analyzer 106 is associated with a memory device 108, which prestores therein a VCI/VPI conversion table information as shown in FIG. 6.

Assume that a cell-data transmission is performed with the terminal 96 interconnected with the network 84 being as a source and terminal 98 interconnected with network 86 as a destination. After a data-transferring route is determined, when several data cells come into IWU 92, every cell is temporarily stored in the first buffer 100. The header reader 104 reads the header information out of such "buffered" cell, thereby to extract the present value of VPI that is found in a routing header of cell. The read VPI value is fed to the header analyzer 106, which analyzes the VPI, whereby a suitable routing tag is retrieved from the VCI/VPI conversion table 108.

The header reader 104 also reads the value of a VCI parameter out of the data cell. The analyzer 106 uses the read VCI value as a key to retrieve, from the conversion table 108, a set of VCI and VPI values that are suitably correspond to the read VCI of input cell. The retrieved VCI/VPI are added to the cell, which is now moved to be stored in the second cell buffer 102. The cell with the "converted" VCI/VPI parameters is then allowed to go away toward the network 86 including the destination terminal 98. Note that the entry number of the VCI/VPI conversion table 108 may be determined depending upon the actual field length of a data cell.

With the VCI/VPI conversion at the IWU 92, the VPI and VCI values are kept uniform without being rewritten as VPI=#6 and VCI=#7 during the transfer of the data cell from the source terminal 96 within the network 84 associated with this terminal, as shown in FIG. 5. When the cell is output from the network 84 and reaches the IWU 92, the above-mentioned VCI/VPI conversion is performed in the IWU 92. When the cell is output from the IWU 92 to the network 86 including the destination terminal 98, the cell is converted as VPI=#8 and VCI=#6A. The converted VPI/VCI values are kept unchanged during transfer in the network 86. With such an arrangement, the network system can be simplified in structure, and the cost can be reduced without degrading the transfer performance and reliability.

Figure 7:
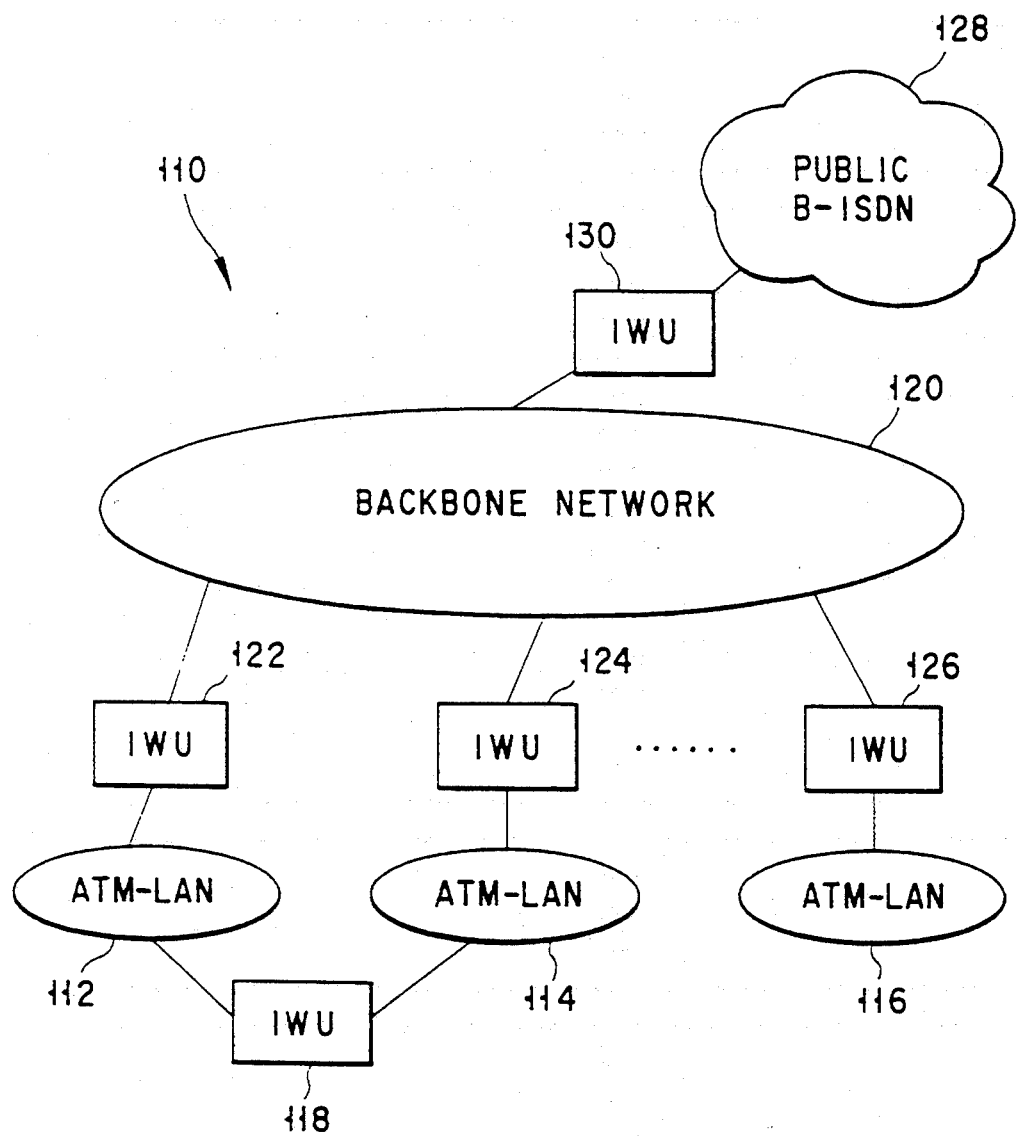
FIG. 7 illustrates a large-scale data communication network system in accordance with a further embodiment of the invention.

A large-scale network system 110 in accordance with another embodiment of the invention is shown in FIG. 7. The network system 110 includes a plurality of ATM local area networks 112, 114, 116, which are associated with a number of data terminals (not shown) and interconnected to one another by IWUs, wherein ATM-LANs 112, 114 are interconnected together by an IWU 118. Each of ATM-LANs 112–116 may be similar to that of FIG. 5 in configuration and function. ATM-LANs 112–116 are also interconnected with a large-scale mother network of a preselected type, which may be a "backbone" type network 120. A corresponding number of IWUs 122, 124, 126 are employed to let ATM-LANs 112–116 be associated with backbone network 120 to provide a hierarchical network structure as a whole. The backbone network 120 is connected with a public communication network 128 by way of an IWU 130, thereby to enable any one of data terminals of an ATM-LAN to be communicate with the public broadband integrated services digital network (B-ISDN) 128.

With the embodiment network 110, in all the ATM-LANs 112-116, each of the components (such as data terminals, cell exchange nodes, control modules, severs, etc.) is assigned with a VPI that is acquired at the time of booting. Cell routing is performed on such assigned VPIs. When ATM connection is set to extend in different ATM networks and/or a public network 128, the ATM cell relaying as has been described in connection with the FIG. 5 embodiment, i.e., the VCI/VPI conversion is performed in the corresponding IWU. For example, in a two-level hierarchical network, the use of such UNI cells makes it possible to accommodate 256 by 256 (=65,536) network constituent elements in the network system.

The following description will be given under an assumption that a network provides two types of ATM connections. The discussions may also to applied to the case of a network providing a larger number of types of ATM connections, by slightly modifying the judgment scheme or algorithm for connections so as to correspond to at least two types of connections while the principles laid behind them is same.

This embodiment provides two types of ATM connections: a peak band assignment connection and a peak band nonassignment connection. The peak band assignment connection uses a value for attaining a reduced delay and a reduced cell loss ratio, which value will lead to the possibility of a high-quality data transmission. The peak band nonassignment connection is a connection wherein any one of the cell transfer delay and the cell loss ratio does not have a target quality (QoS); in this respect, the latter may be called the "Non-QoS" connection. Which one of the two types of connections is used as the communication connection of application may be selectively determined at a user's level.

Each of the IWUs 118, 122–128 of FIG. 7 includes an input processing module inside a cell-exchange node, which may be arranged as shown in FIG. 8, wherein the module configuration may be similar to that of FIG. 4 with the header analyzer being modified to be associated with a first and a second memory devices, and the header reader being further coupled directly to the header generator as will be described in detail below.

As shown in FIG. 8, the IWU includes a series circuit of first and second cell buffer units 132, 134. The first cell buffer 132 has an input coupled to a corresponding data-incoming port 136; the second cell buffer 134 has an output connected to a data-outgoing port 138. First buffer 132 is also interconnected a header read section 140, which has a first output connected to a header analyzer section 142, and a second output coupled to a first input of a header generation section 144 by way of a direct link 146. Header analyzer 142 has an output coupled to a second input of header generator 144, which is connected at its output to second buffer 134.

The header analyzer 142 is associated with two memory devices: a first memory 148 prestoring therein a first conversion table information, and a second memory 150 prestoring a second conversion table. These memories are interconnected to header analyzer 142 by a first and a second access lines 152, 154, respectively. The first conversion table 148 is a routing-tag table that provides a list of a preselected number of VCI values as entry items, together with a list of corresponding number of address mask and routing-tag information, each set of which may correspond to one of entry VCI values in a one-to-one correspondence manner. 10 The second conversion table 150 is another routing-tag table that provides a list of a preselected number of entry VPI values together with a list of a corresponding number of VCI values and routing-tag information parts, each set of which may correspond to one of entry VPI values in a one-to-one correspondence manner.

As shown in FIG. 8, the second cell buffer unit 134 includes a selector circuitry 156, which has a first input connected to the output of the first cell buffer unit 132, a second input coupled to the output of the header generator 144, a first output connected to the data-outgoing port 138 by way of series of buffer 158, 160, and a second output connected to the last-stage buffer (acting as a data-transmitter output buffer) 160 through another buffer 162. A controller 164 is provided connected to the buffers 158, 162.

When a data cell is input from the input port 136, the cell is temporarily stored and "buffered" in the first cell buffer unit 132. The header reader 140 reads out the parameter contents of the header of the buffered cell to extract the VPI value presently written therein. The extracted VPI value is sent to the header analyzer 142. The analyzer 142 analyzes this VPI value to retrieve appropriate routing tag information with an assistance of the first and second routing tag tables 148, 150.

During retrieval of the above routing tag, the cell is moved from the first buffer unit 132 to the second buffer 134. In this case, the header reader 140 reads the contents of the routing header of the cell and transfers the VCI/VPI parameters written therein to the analyzer 142. Upon the receipt of the read VCI/VPI values, the analyzer 142 performs a logical operation between the address mask information retrieved from the table 148 as a VPI key and the VCI information to determine whether the VCI represents the cell of peak-assign connection or Non-QoS connection. For example, when the connection is determined whether to be the peak-assign connection or the Non-QoS connection on the basis of the first bit value of the VCI, the address mask will be "10000000 00000000". If a continuous symbol area of the VCI from 0 to 255 is a symbol space assigned to the peak-assign connection, the address mask is set to "11111111 00000000".

If the above masking operation result represents that the cell is of the peak-assign connection, the header analyzer 142 performs retrieval of the second conversion table 150. The entries of this table are the VPI and VCI. Using these VPI and VCI as retrieval keys, the analyzer 142 finds an appropriate routing tag. The found routing tag is transferred from the analyzer 142 to the header generator 144, and almost as the same time, a cell loss priority (CLP) bit-information is transferred from the header reader 140 to the header generator 144 through the direct link 146. The header generator 144 uses the retrieved routing tag (RT) information and the CLP information to "draft" or product a suitable routing tag header. The resultant routing tag header is transferred to the second cell buffer unit 134. The second cell buffer unit 134 has already stored the cell. The above routing tag header is added to the cell. The form of the routing tag header added to the cell is the same as shown in FIG. 4. The RT-added cell is output from the output port 138 to a target network.

The format structure of the routing tag-added data cell is shown in FIG. 9 in detail. This is obtained under the assumption that the buffer has two priority levels and a cell (i.e., the priority loss cell) having a CLP of "1" in the peak-assign connection is identical in priority level to the cell of Non-QoS connection. As shown in FIG. 9, the cell essentially consists of an information field 170 called a "payload", and a header section 172. The header 172 may include several parameters such as VCI, VPI, generic flow control (GFC), and routing tag (RT). RT may further contain two subparameters: a switch-inside routing tag (SRT) and a buffering tag (BF). In this case, for example, a cell of CLP="0" of the cells of peak-assign connection is buffered in the buffer 158 of FIG. 8. Of all the cells of peak-assign connection, the cell of CLP="1" and the cell of Non-QoS connection are buffered in the buffer 162 of FIG. 8.

When a cell is present in the buffer 158 of FIG. 8, the cell is always processed (output). On the other hand, the cell in the buffer 162 is output only when no cell is present in the buffer 158. Selective cell outputs from the buffers 158, 162 to the output buffer 160 are performed under the control of the controller 164 connected to these buffers 158, 162. The cell of CLP="0" of peak-assign connection is preferentially output in any event. In other words, the cell of CLP="0" of peak-assign connection is output at a small transfer loss ratio and a small delay.

In the cell format of FIG. 9, CLP bit information transferred from the header reader 140 of FIG. 8 and the bit representing the connection type and transferred from the header analyzer 142 is logically operated (logical OR) to determine the buffering tag representing a buffering policy. An intra-switch routing tag represents routing information in each of the cell switches (IWUs).

FIG. 10 shows a routing tag retrieval algorithm with an assistance of the first and second tables 148, 150 associated with the input process of the IWU in FIG. 8. First of all, at step 174, using a presently read VPI value of the input cell as a key, address mask information corresponding to the VCI of this cell is retrieved. At step 176, the retrieved address mask and the VCI of the input cell are logically ANDed. At step 178, the connection is identified or determined whether to be the peak-assign connection or the Non-QoS connection on the basis of the AND signal. If the VCI is a value within a space expressed by the address mask, the connection is determined to be the Non-QoS connection, and the step output is "NO". Otherwise (if the VCI is a symbol which cannot be expressed by the address mask), the connection is determined to be the peak-assign connection, and the step output is "YES".

If "NO" at step 178, the header analyzer 142 of FIG. 8 looks up the first table 148. The analyzer 142 finds routing tag information corresponding to this VPI from the contents of the first table 148, which is then sent at step 180 toward the cell buffer unit 134 of FIG. 8. If "YES" at step 178, the contents of the second table 150 are retrieved using the VCI as a key at step 182, thereby finding the routing tag information corresponding to the VCI. This routing tag information is supplied to the output buffer 160 at step 184. In any case, at step 186, the cell buffer 134 adds any routing tag fed thereto to the cell transferred from the first cell buffer unit 132. At step 188, buffering control is performed.

Note here that the contents of the first table 148 are updated in the following two events:

(1) when the data terminal concerned is booted in the ATM-LAN corresponding to the network system 110 of this embodiment, and (2) when the transfer route of the cell is changed by routing control.

The contents of the second table 150 are updated in the following two events:

(1) when a connection (peak-assign connection) is set (all the present entry information is deleted when the connection is released), and (2) when the cell transfer route is changed by routing control.

The "connection-oriented" connection will be described below. This is also part of the inventive contribution of the present invention. The connection of this type includes two types of connections described above, i.e., the peak-assign connection and the Non-QoS connection. These two types of connections have different cell routing control operations; different routing operations employ different processes.

Figure 11:
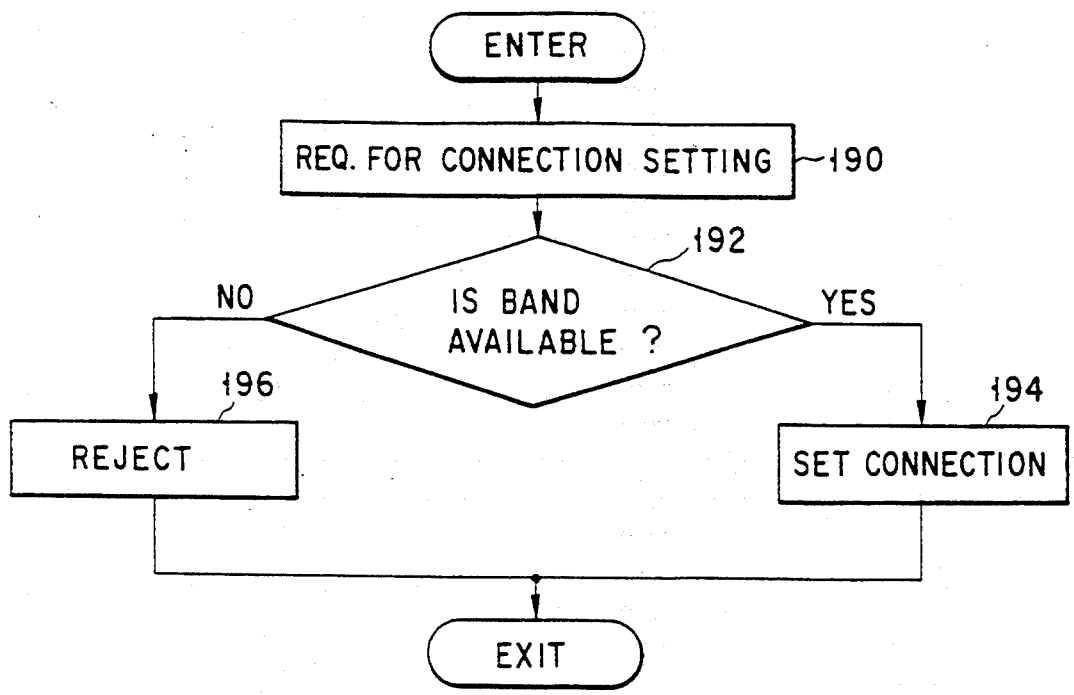
FIG. 11 is a flowchart of a peak-assign connection setting routine to be implemented in the embodiment.

The connection-setting procedure of the peak-assign connection will be described with reference to a flow chart in FIG. 11.

The route of the peak-assign connection is dynamically selected, and this dynamic selection is performed only during the connection-setting procedure. FIG. 11 is the flow chart showing the setting procedure for the peak-assign connection. When a request for connection setting is generated (step 190), a band is attempted to be assured along a route determined as an optimal route. It is determined at step 192 whether the band can be assured or available along the selected route. If YES at step 192, connection setting is performed (step 194). Otherwise, the request for connection setting is rejected (step 196).

It is determined at step 192 that the connection can be set, the second table 150 (FIG. 8) for retrieving the routing tag, which is arranged in the input processing module of each cell exchange node is set. More specifically, VCI entries for setting the connection and the routing tag information are registered in the VPI entry portion in the corresponding destination terminal. If communication extends across a plurality of ATM-LANs, entry information of a VCI/VPI rewrite table 108 in the header analyzer (e.g., 106 in FIG. 6) in the IWU is registered.

Figure 12:
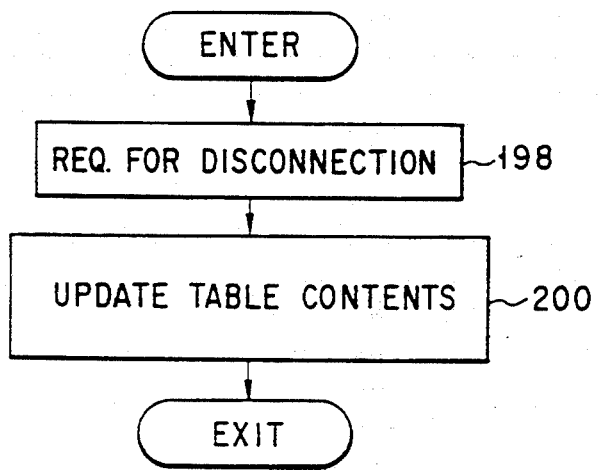
FIG. 12 is a flowchart of a connection-disenabling (disconnection) routine implemented in the embodiment.

The entry information for the VCI/VPI rewrite table 108 in the IWU and the tables 148,150 for the cell exchange node is deleted upon generation of a request for disconnection (steps 198, 200 in FIG. 12).

The registered routing information is not updated except for a special condition (e.g., a link failure) unless the disconnection is performed. The route of a newly set connection is selected on the basis of the latest network information. For this reason, different routes may be set for each destination/source combination.

In routing control of internetwork level (host network level), control information which designating a specific sub-network as a "via" network is updated depending on given conditions. That is, an appropriate sub-network, i.e., an appropriate IWU is selected in connection setting. Once the IWU is selected, the routing table of the cell exchange node is not updated for the peak-assign connection during connection setting, and the cells are transferred through the same route. The route is set during connection setting. For this reason, if the setting period changes, each destination/source combination may take a different route, i.e., a route in the sub-network or a route through the sub-network.

Routing control in the ATM-LAN can be performed under the condition that the cell exchange node is set as a node on routing control. In order to perform better load balancing, each input port and each output port are defined as nodes on routing control. That is, an optimal route from a given input port to a given output port is retrieved. Therefore, if at least one of the input and output ports changes, a different route may be selected although these ports belong to the same cell exchange node.

The Non-QoS connection will be described below.

Routing control of the Non-QoS connection is not performed for each connection, but for each cell. If the connection is determined to be Non-QoS connection upon VCI masking, a routing tag corresponding to the VPI is added. The routing tag information corresponding to this VPI is arranged to be dynamically updated in accordance with the network condition. That is, a process which is performing control of the routing of the Non-QoS connection updates the routing tag entry information in the first table 148 in FIG. 8 when the routing information is updated. Therefore, cells belonging to one connection may be transferred to the cell transmitter or the IWU of the destination terminal through different routes.

In the connection extending across ATM-LANs, the values of the IWU and VCI/VPI to be transferred are kept unchanged. Cells can be transferred without changing the VCI/VPI rewrite table 108 in the IWU. The VCI/VPI information does not change, and only the route is changed. That is, in the process for performing routing control of the Non-QoS connection, the information of the table 148 is updated whenever the route must be changed.

Routing control in the ATM-LAN can be performed such that the cell exchange node is set as a node on routing control. In order to perform better load balancing, each input port and each output port are defined as nodes on routing control. That is, an optimal route from a given input port to a given output port is retrieved. Therefore, if at least one of the input and output ports changes, a different route may be selected although these ports belong to the same cell exchange node.

A connection for connectionless communication will be described below.

The Non-QoS connection is used in transfer of a cell for connectionless communication. That is, a preset Non-QoS connection is used in transfer of a cell to a destination cell transmitter in the ATM-LAN. A practical cell transfer route is the same as in the Non-QoS connection in the connection-oriented connection described above. The transfer route of the cells in the ATM-LAN can be dynamically changed.

Routing control executed on the network level (host network level) extending across ATM-LANs is basically the same as the control in the connection-oriented connection. A sub-network and a CLS (connectionless server) are defined as nodes on routing control.

Routing control will be described below. A multi-level hierarchical network system 210 called an "ATM-internetwork" shown FIG. 13 includes ATM-LANs 212, 214, 216,218, 220 serving as a plurality of subnetworks. These sub-networks are interconnected through IWUs 224, 226,228, 230, 232. The sub-network 216 includes lower networks 238a to 238d further illustrated in the lower portion of FIG. 13 as in other subnetworks. In this two-level network configuration, each sub-network may be arranged in the structure independently of its upper networks (host networks). In this embodiment, the number of hierarchy systems is give as "2" for purposes of explanations only.

Figure 13:
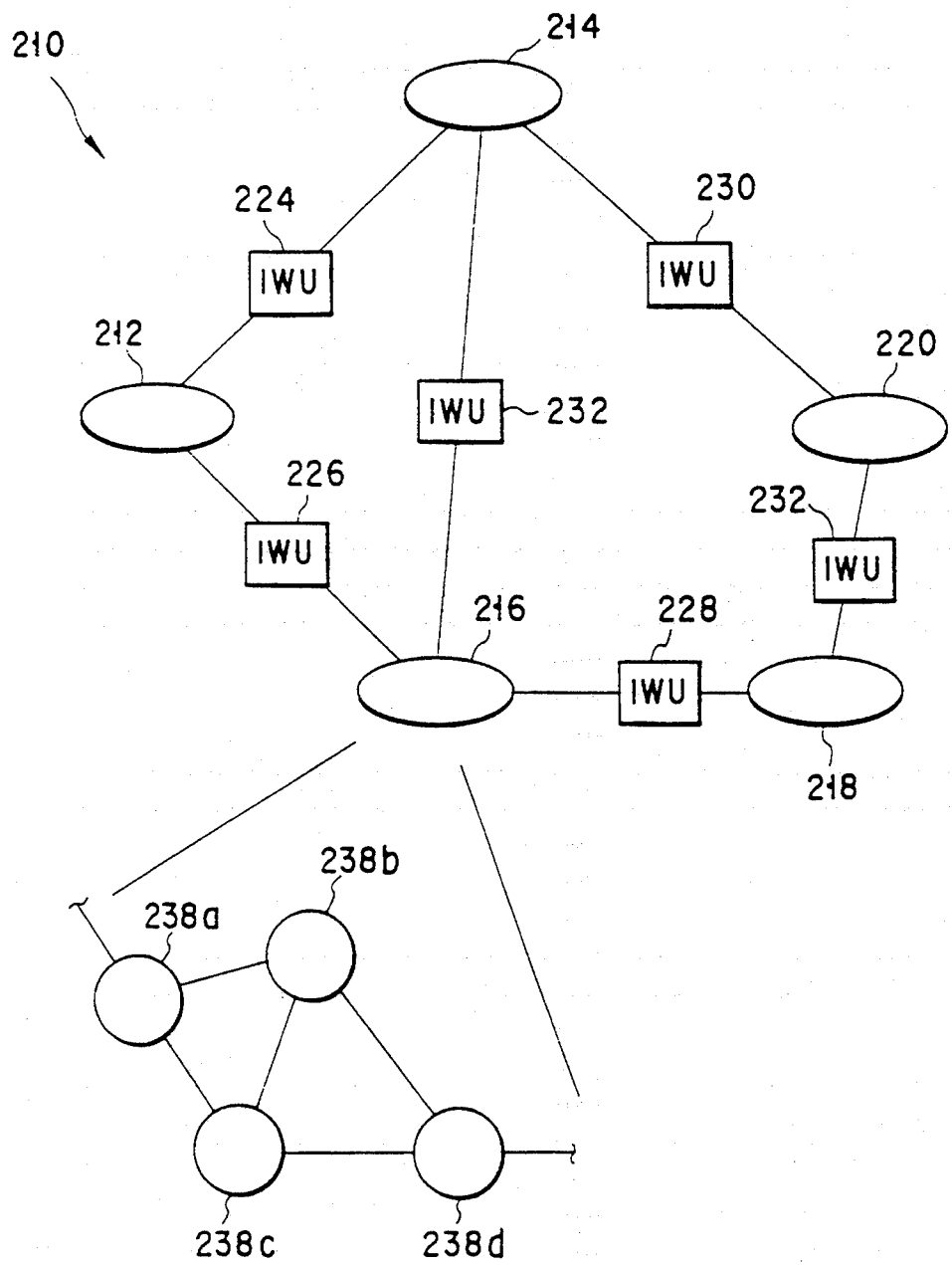
FIG. 13 shows a multi-hierarchical network system including a plurality of ATM-LANs each containing subnetworks also embodying the invention.

The host networks 212 to 222 in FIG. 13 are "shielded" from the sub-networks 238a to 238d serving as lower networks in the configuration, as conceptually illustrated in FIG. 14. The sub-networks 238a to 238d are separately illustrated in FIG. 15 to demonstrate independency of the host networks. In other words, in the network system of FIG. 14, the interconnection of the sub-networks in FIG. 15 is assumed to be one node. The above network system is configured in units of connection categories, and each network is operated in accordance with a corresponding one of the routing control protocols. For example, routing control for the "connection-oriented" connection is executed connection by connection every time the connection is set and/or released in such a manner that a data transfer route is selected on the basis of a remaining band width or the like.

On the other hand, routing control for the connection for connectionless communication is executed cell by cell as in the conventional data communication, and the route is selected on the basis of a cell loss ratio or the like.

A node (each sub-network directly corresponds to a node in FIG. 14) required for routing control can be arbitrarily defined for each connection category. For example, the network configuration can be defined on the basis of the following substance:

(1) sub-network (physical substance)
(2) logical sub-network
(3) server (e.g., a connectionless server)

The node defined by the sub-network can constitute a certain space which is perfectly shielded from the host networks. Information having reached a node defined by the host network is routed in accordance with sub-network routing control. In this embodiment, as shown in FIG. 15, the ATM-LAN configuration is defined as the configuration of the sub-networks 238a to 238d, and the internal routing control in each sub-network is constituted a closed loop in this sub-network.

Address information required for routing control of each hierarchical layer in each network may be address space information (e.g., an address space mask) or address point information (address symbol). That is, the node required for routing control need not be physically one entity, but may be a node defined in a network level of a certain layer.

Routing control can be executed on the basis of different policies given to objects subjected to routing control. That is, different routing control operations can be performed in one hierarchical network.

The defined hierarchical network configuration (node definition method) is also defined for each target object subjected to routing control. That is, different network configurations can be established for each hierarchical level. For example, in the connection-oriented communication, the physical sub-network corresponds to the node. However, in connectionless communication, the connectionless server defines the network configuration such that a sub-network (a plurality of sub-networks are processed as one sub-network) is regarded as a node, thereby performing routing control.

The actual operational procedure of routing control can vary depending on control objects. For example, in connectionless communication, the routing table is sequentially updated depending on the network states. In connection-oriented communication, the routing table can be updated depending on network states upon retrieval of the route during connection setting.

A method of realizing an address resolution procedure will be described below.

First, a method of realizing the address resolution procedure in the conventional system will be described. The conventional address resolution procedure is exemplified by mapping between IP addresses and Ethernet MAC addresses, which mapping is generally realized in the Ethernet. Alternatively, mapping from internetwork address to IP addresses, which is performed in an internetwork is also exemplified.

In the Ethernet, an address resolution protocol (ARP) and a reverse address resolution protocol (RARP) are defined as protocols for acquiring addresses. In the ARP, an ARP request packet including IP address information is sent to an NIS (network information server) or to a destination terminal through a broadcast channel. Upon the receipt of the request packet, the NIS or destination terminal sends back MAC address information to a source terminal from which the APR request is sent. Similarly, a packet including the MAC address information of the RARP request terminal is output to the network, and the NIS or destination terminal sends back a packet including the IP address information. The NIS can be accessed using the broadcast channel or a point-to-point channel.

On the other hand, the broadcast channel is used to access the destination terminal. A response from the NIS or target terminal is sent back using the broadcast channel or the point-to-point channel.

In this embodiment, VPI routing will be described below. First, a method using an NIS will be described. The NIS is accessed using a broadcast channel or a point-to-point channel. The NIS comprises a means for storing at least an information table shown in FIG. 16 or a larger information table having the information entries of the table of FIG. 16. The NIS retrieves information in such a table upon the receipt of an ARP or RARP request cell. In the ARP, the logic address is given to VPI retrieval using the logic address as a key. It is impossible to perform this in a conventional B-ISDN because the ARP in the conventional B-ISDN is connection setting. In the B-ISDN, VCI/VPI parameters for transferring cells to any interface point are not set unless the connection is set.

The permanent virtual connection (PVC) settings allow the ARP procedures. However, the VCI/VPI values are uniform for each interface point. For this reason, the table information retrieval key of the NIS must be not only the logic address of the destination terminal, but also the logic address of its own terminal, i.e., the source terminal sending the ARP request. That is, as shown in FIG. 17, the size of the management information table is larger than the table of this embodiment in proportion to at least the square of the number of terminals accommodated in this network.

A VPI number is used as a key to perform retrieval in response to an RARP request. A logic address of a terminal supposed to be analyzed is written in the RARP cell. The NIS performs retrieval using a VPI value. The retrieval result is written in the RARP response cell and sent back to the RARP request terminal using a broadcast cell or a point-to-point cell. The RARP procedures of the conventional B-ISDN are meaningless and cannot be realized. An arbitrary terminal in the network can acquire the logic address of the arbitrary terminal in the network from the VPI address in accordance with the RARP procedures.

A method of causing the destination terminal to process the ARP/RARP request will be described below. In this case, the terminal has a function of storing its own VPI number and its own logic address information. Upon the receipt of the ARP/RARP request cell, the destination terminal writes, in a response cell, the VPI number corresponding to the logic address for the ARP or the logic address corresponding to the VPI number for the RARP.

The boot procedures of the network constituent elements included in the network system of this embodiment are performed as follows. The boot procedure is an initializing operation performed when a certain network constituent element such as a data terminal is connected to the network. Referring to FIG. 18, a plurality of data exchange nodes or switches 240, 242, 244 are illustrated. The switch 240 is associated with data input/output ports 245 and a routing table-set server 246. The switch 242 is interconnected to ports 248 and a routing table-set server 250. The VPI server 252 is associated with a corresponding one of the ports 248. The VPI server 252 incorporates a memory for storing the first table information 138 and the second table information 150 shown in FIG. 8. The switch 244 is interconnected to ports 254 and a routing table-set server 256. The routing tag (RT) server 252 is interconnected to one of the ports 254.

Figure 19:
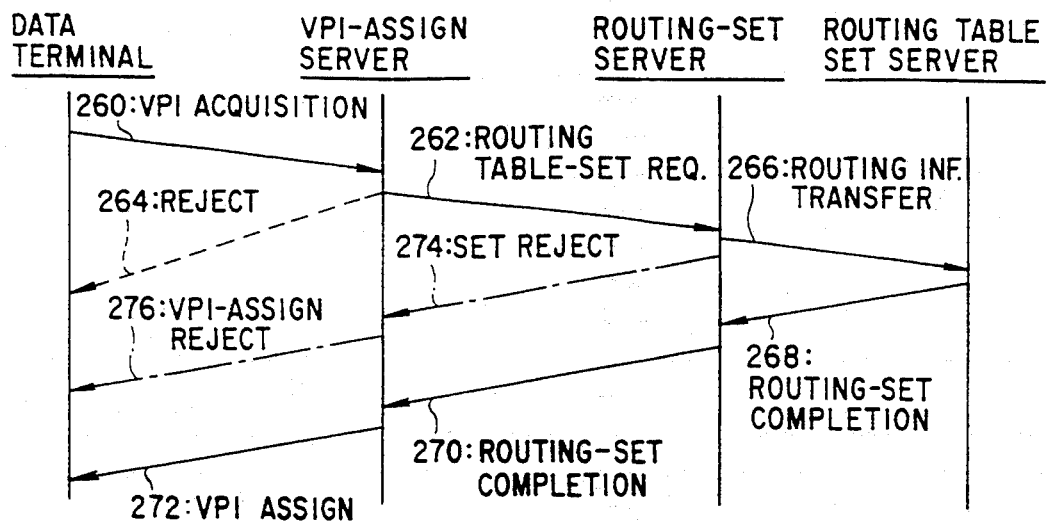
FIG. 19 is a diagram showing how a boot procedure is carried out among the terminals and several servers of FIG. 18.

The boot procedures of general network constituent elements, i.e., data terminals, except for the constituent elements required for management control of the network will be described with reference to a task-flow diagram shown in FIG. 19. Referring to FIG. 19, a data terminal, a VPI-assign server, a routing-set server, and a routing task set server are juxtaposed in accordance with the task flow. This illustration is very popular in the field of computer communication network techniques related to the present invention so as to visually illustrate the task flow.

As shown in FIG. 19, a terminal sends a VPI acquisition request 160 to the VPI-assign server in the boot process. Message transmission can be performed by the first method using a broadcast channel, the second method using a metasignaling channel, or the third channel using the virtual channel of a predefined VPI server.

Each network constituent element, a user-side interface module, and a UNI module (UNI interface module) must be assigned with addresses uniform in the network. Address information such as node ID+port ID, of at least the UNI module (UNI interface module), must be included in an VPI-assignment request message sent to the VPI-assign server because the port of the cell exchange node to which a network constituent element sending a boot request is connected must be identified. This address information is indispensable information in setting the routing table.

In a configuration wherein a cell transmitter is connected to the interface board of the UNI interface point of a cell exchange node through an ATM interface board, address information (e.g., physical address information of the interface board at the UNI interface point) for causing the network to identify a physical position at which at least the cell transmitter is connected is included in the VPI acquisition request cell of the cell transmitter. For example, the address information is written by the UNI interface module. A logic address which can be identified by the network may be used in place of this address information.

The method (first method) using the broadcast channel includes the following two methods.

(1-1) All protocol processes are performed using the broadcast channel.

(1-2) The broadcast channel is used as a channel for finding VP of a VP-assign server.

The method (second method) using the metasignaling channel includes the following two methods: all protocol processes are performed using the metasignaling channel; and the metasignaling channel is used as a channel for finding the VP of the VP-assign server. In the third method described above, the VP of the VPI-assign server is defined in advance, and this VP channel is used.

Referring to FIG. 19, upon the receipt of the VPI acquisition request cell, the VPI-assign server (252 of FIG. 18) requests (262 of FIG. 19) setting of the routing table to a necessary routing-set server (258 of FIG. 18) if the VPI is assignable. If no VPI reservation is available, the VPI acquisition request is rejected (264). When the routing table is completely set, at least one routing table-set server (256 of FIG. 18) transfers a routing table-set completion message (268, 270) to the VPI-set server in response to the transfer (266) of the routing table-set information. Upon the receipt of the message 270, the VPI-set server transfers the VPI assignment completion message (272). Note that it is possible to include the assigned VPI information in the message 272. If routing table set has been failed, a routing table-set rejection message (274) and a VPI assignment rejection message (276) are transferred. By the above procedures, the VPI is assigned to the network constituent element subjected to booting.

A boot procedure of an element constituting a network body, such as a cell exchange node and a VPI-assign server, of the network constituting elements, will be described below. In order to establish a communication channel, a connection must be set between at least one VPI-assign server 252 of FIG. 18 and at least one routing-table server (RT server) 258.

The boot procedures of other networks are substantially the same as those of the normal cell transmitter. The RT server 258 is generally arranged in each cell exchange node, but may be arranged outside the switch. Each network generally has one VPI server 252, but a plurality of VPI servers may be arranged to obtain a cooperative, distributed network so as to improve network reliability.

Servers in the networks are present in a variety of combinations. Note that set operations of the routing table using the broadcast channel and VPIs have been completed. In a system having a metasignaling channel, set operations of the metasignaling channel VPI and the routing table have been completed. Practical boot procedures for various combinations of servers will be described below.

(1) Case wherein one VPI Server and one RT Server exist in Network

In this case, one VPI server and one RT server are present in the network, and the cell transfer table (routing table) of the cell exchange node is set to cause these two serves to communicate with each other. For this purpose, the following methods are used.

(1-1) Method Using Broadcast Channel

The VPI server 252 of FIG. 18 acquires a physical address for accessing processors 246, 250, 256 for controlling the routing table of each cell exchange node in accordance with a method to be described later. This physical address is an address except for the ATM-layered address, and is, for example, the physical address of a process port in the cell exchange node. This method is regarded as an ARP technique for acquiring an identifier for identifying a switch. However, if an address capable of guaranteeing the uniqueness in the network level, such as a network layer address, is used in place of the above physical address, this can be used.

The VPI server 252 request, to the RT server 258, setting of the routing table using the broadcast channel. At this time, the VPI server 252 sets its own VPI number. In this message, at least an address of the port 248 of the cell exchange node connected to the VPI server 252 must be written.

Upon the receipt of the routing table-set completion message from all the cell exchange nodes 240 to 244 in the network, the RT server 258 sends back the routing table-set completion message to the VPI server 252.

The routing table-set completion message from the RT server 258 to the VPI server 252 is sent upon the receipt of the table-set completion messages from all the switch nodes. A protocol for confirming these settings can be a protocol for guaranteeing the reliability such as a time-out. In addition, if the set completion cannot be confirmed after several trials, this is notified to the VPI server 252.

Since a VPI server present in the network is not only the VPI server 252 and the network constituent element assigned with the VPI is only the VPI server 252, it is guaranteed that no VPI batting occurs. To confirm that any other VPI server is not present in the network, the VPI server 252 may have a protocol for confirming the presence of a VPI server. If any other VPI server is present in the network, this server is not booted.

The VPI server 252 transfers the address information of the switch, i.e., the address information of its own cell exchange node and each port address information to the RT server using the broadcast channel. In addition, the RT server 258 operates the routing protocol to designate a route between arbitrary ports using the broadcast channel. The network configuration information can be acquired such that it is set by a network manager in advance or by operating a network protocol such as a routing protocol. By the above procedures (protocol), upon the receipt of the VPI-set request from the VPI server, the RT server sets a table for transferring cells to the VPI server in each cell exchange node, thereby assuring the route to the VPI server.

Routing table setting and VPI assignment for transferring cells to the RT server 258 are performed. The RT server sends a VPI acquisition request for the VPI to the set VPI server or the VPI server using the broadcast channel. Upon the receipt of the VPI acquisition request, the VPI server assigns the VP and requests the setting of the routing table to the RT server using the broadcast channel. Upon the receipt of the routing table-set request, the RT server sets the routing table of each cell exchange node using the broadcast channel. More specifically, the routing table-set processors are accessed using the identifier of each cell exchange node. When the routing table-set completion is confirmed, the routing table-set completion message is sent from the RT server to the VPI server.

In order to set the access table for the processor module for controlling the routing table of each cell exchange node, the RT server sequentially sends VPI acquisition requests for the routing table control processor modules arranged in the respective cell exchange nodes. The VPI acquisition request can be sent using both the broadcast channel and the already set channel.

Upon the receipt of the VPI acquisition requests, the VPI server sends a routing table-set request to the RT server. The RT server sets the routing table using the broadcast channel. Access to the cell exchange node whose route is already set using the VPI can be performed by a method using the broadcast channel or a method using the already set channel. By the above procedures, a communication route between the VPI server, the RT server, and the routing table-set processor in each cell exchange node is established.

The subsequent communication between the three elements can be performed through the set communication channel. However, the broadcast channel may be used in place of the set communication channel. It is appropriate to use the broadcast channel in the subsequent communication only if a communication error is detected. In this embodiment, the communication route between the VPI server, the RT server, and the routing table-set processor of each cell exchange node is sequentially established. However, in the procedure for setting the route to the first element, i.e., the VPI server, the VPI server can send routing table-set requests for all the three elements. If the three elements (or two elements) are present at the same position, they can communicate with each other without going through the network, and a message can be handed directly therebetween.

(1-2) Method Using Metasignaling Channel

The RT server must be arranged to be directly accessed from a point at which the metasignaling channel is terminated. It is also possible to relay the metasignaling channel to access the RT server. The routing table for the three elements must be preset.

(1-3) Method Using Already Set Channel

This case indicates that a channel connecting the three elements is preset. Each server arranged at a specific port of a cell exchange node is designated in advance. An operation check is performed in the boot operation.

(2) Case in which One VPI Server and Many RT Serves exist in Network

A plurality of RT servers are present (a) when the RT servers are distributed to share management/control of routing table-set information, (b) when the RT servers basically manage routing information in the network and serve as in a master-slave model to improve reliability.

(2-1) Method Using Broadcast Channel

The VPI server acquires a physical address for accessing a processor for controlling the routing table of each cell exchange node. The VPI server acquires an identifier for identifying each cell exchange node. The VPI server requests the setting of the routing table to the RT server using the broadcast channel. At this time, the VPI server sets its own VPI number. An RT server communicating with the VPI server receives a routing table-set completion message of each of all the cell exchange nodes in the network through the broadcast channel and sends back a routing table-set completion end message to the VPI server.

A subsequent routing table-set completion message from each RT server to the VPI server is sent upon the receipt of the table-set completion messages of all the cell exchange nodes. A protocol for confirming these settings is, for example, a protocol for guaranteeing reliability such as a time-out. Even if the set completion is not confirmed after several trials, this is notified to the VPI server.

In a master-slave type RT servers, the VPI server accesses any one of the servers in the network. However, in a cooperative, distributed RT servers, the VPI server accesses an RT server which must be communicated first. In the cooperative, distributed RT servers, access of the VPI server to the first RT server is equivalent to access of the VPI server to all the RT servers. In the cooperative, distributed RT servers, communication between all the RT servers, i.e., boot communication is performed through the broadcast channel. In the cooperative, distributed RT servers, each RT server is basically arranged in each switch. In cluster management, each RT server is present for a plurality of switches.

Since only one VPI server is present in the network, i.e., a constituent component assigned with the VPI is only one, no batting of the VPI occurs. To confirm that any other VPI server is not present in the network, the VPI server may have a protocol for confirming the presence of a VPI server. In addition, address information (the address of the cell exchange node itself and address information of each port) of the cell exchange node can be sent from the VPI server to the RT server through the broadcast channel. In addition, the RT server may operate the routing protocol to designate a route between arbitrary ports.

Upon the receipt of a VPI-set request from the VPI server, the RT server sets a table for transferring cells to the VPI server in each cell exchange node, thereby assuring a route to the VPI server. Setting of the routing table for transferring the cells to the RT server and VPI assignment are performed. The RT server sends a VPI acquisition request to the VPI server using the VPI of the set VPI server or the broadcast channel. Upon the receipt of the VPI acquisition request, the VPI server assigns a VPI and sends a routing table-set request to the RT server using the broadcast channel. Upon the receipt of a routing table-set request, the RT server sets the routing table of each cell exchange node using the broadcast channel. That is, as in setting of the routing table to the VPI server, the routing table-set processor is accessed using the identifier of each cell exchange node. If the routing table-set processors are located at the same position as that of the RT server, i.e., if communication can be performed without going through the network, direct access without going through the network can be performed.

When routing table-set completion is confirmed, a routing table-set completion message is notified from the VPI server to the RT server. In order to set the access table for the processor module for controlling the routing table of each cell exchange node, the RT server sequentially sends VPI acquisition requests for the routing table control processor modules arranged in the respective cell exchange nodes. The VPI acquisition request can be sent using both the broadcast channel and the already set channel. Upon the receipt of the VPI acquisition requests, the VPI server sends a routing table-set request to the RT server. The RT server sets the routing table using the broadcast channel. Access to the cell exchange node whose route is already set using the VPI can be performed by a method using the broadcast channel or a method using the already set channel.

By the above procedures, a communication route between the VPI server, the RT server, and the routing table-set processor in each cell exchange node is established. The subsequent communication between the three elements can be performed through the set communication channel. However, the broadcast channel may be used in place of the set communication channel. It is appropriate to use the broadcast channel in the subsequent communication only if a communication error is detected.

In this embodiment, the communication route between the VPI server, the RT server, and the routing table-set processor of each cell exchange node is sequentially established. However, in the procedure for setting the route to the first element, i.e., the VPI server, the VPI server can sends routing table-set requests for all the three elements. If the three or two elements are present at the same position, they can communicate with each other without going through the network, and a message can be handed directly therebetween.

(2-2) Method Using Metasignaling Channel

The RT server must be arranged to be directly accessed from a point at which the metasignaling channel is terminated. It is also possible to relay the metasignaling channel to access the RT server. The routing table for the three elements must be preset.

(2-3) Method Using Already Set Channel

This case indicates that a channel connecting the three elements is preset. Each server arranged at a specific port of a cell exchange node is designated in advance. An operation check is performed in the boot operation.

(3) Case in which Many VPI Servers and One RT Server exist in Network

A plurality of VPI servers are used (a) when VPI servers perform VPI management in a cooperative, distributed manner and (b) when all the VPI servers basically manage the conditions of assignment of the VPI reservation in the network to improve reliability.

(3-1) Method Using Broadcast Channel

A master VPI server acquires a physical address for accessing a processor for controlling the routing table of each cell exchange node, i.e., an identifier for identifying a switch. A method of determining the master VPI server is a method of causing a manager to determine a master VPI server in advance or a method of autonomously determining a master VPI server. When a failure has occurred in the master VPI server (the master VPI server is determined in the same manner as described above), a protocol for defining one of the slave VPI servers as a master VPI server is used. This protocol may be, for example, a protocol used in an FDDI without any modification.

The VPI server requests the setting of the routing table to the RT server using the broadcast channel. At this time, the VPI server sets its own VPI number. Since a plurality of VPI servers are present in the network, any protocol for assigning the VPI number is used. Upon the receipt of routing table-set completion messages of all the cell exchange nodes in the network, the RT server communicating with the VPI servers sends back a routing table-set completion message to the VPI server.

The routing table-set completion message from the RT server to the VPI server is sent upon the receipt of the table-set completion messages of all the cell exchange nodes in the same manner as described above. A protocol for confirming these settings can be a protocol for guaranteeing reliability such as a time-out. When the set completion is not confirmed after several trials, this is notified to the VPI server. The assigned VPI is notified using the broadcast channel, the remaining VPI servers can recognize the VPI of the booted VPI server.

The master VPI server already transfers the address information of the cell exchange nodes, i.e., the address of the cell exchange node itself and the address information of each port to the RT server through the broadcast channel. The RT server can operate the routing protocol to designate a route between arbitrary ports. Upon the receipt of the VPI-set request from the VPI server, the RT server sets a table for transferring cells to the VPI server in each cell exchange node. The slave VPI servers sequentially acquire the VPI, thereby setting the communication channel between the VPI servers.

The setting of the routing table for transferring the cells to the RT server and the VPI assignment are then performed. The RT server sends a VP acquisition request to the VPI server using the VPI of the set VPI server or the broadcast channel. Upon the receipt of the VPI acquisition request, the VPI is assigned to send a routing table-set request to the RT server through the broadcast channel.

Upon the receipt of the routing table-set request, the RT server sets the routing table of each cell exchange node using the broadcast channel. That is, in the same manner as in the setting of the routing table to the VPI server, the routing table-set processor is accessed using the identifier of each cell exchange node. If the routing table-set processor is located in the same position as in the RT server, i.e., if communication can be performed without going through the network, access can be performed without going through the network. When set completion of the routing table is confirmed, a routing table-set completion message is notified from the VPI server to the RT server.

The RT server sequentially sends VPI acquisition requests for processor modules for controlling the routing tables of the respective cell exchange nodes for the VPI server to set the access table to the processor module for controlling the routing table of each cell exchange node. The VPI acquisition request can be sent through either the broadcast channel or the already set channel.

Upon the receipt of the VPI acquisition request, the VPI server sends a routing table-set request to the RT server through the broadcast channel. Access to the processor of each cell exchange node whose route is set with an VPI is performed by a method using the broadcast channel or a method using the set channel.

The VPI of the set RT server and the VPI of the routing table-set processor of each cell exchange node are finally notified to all the VPI servers in accordance with broadcasting of the setting number or a communication protocol between the VPI servers. Alternatively, a conventional VPI acquisition algorithm can be used to acquire the VPI server.

By the above procedures, a communication route between the VPI server, the RT server, and the routing table-set processor in each cell exchange node is established. The subsequent communication between the three elements can be performed through the set communication channel. However, the broadcast channel may be used in place of the set communication channel. It is appropriate to use the broadcast channel in the subsequent communication only if a communication error is detected.

In this embodiment, the communication route between the VPI server, the RT server, and the routing table-set processor of each cell exchange node is sequentially established. However, in the procedure for setting the route to the first element, i.e., the VPI server, the VPI server can send routing table-set requests for all the three elements. If the three or two elements are present at the same position, they can communicate with each other without going through the network, and a message can be handed directly therebetween.

(3-2) Method Using Metasignaling Channel

The RT server must be arranged to be directly accessed from a point at which the metasignaling channel is terminated. It is also possible to relay the metasignaling channel to access the RT server. The routing table for the three elements must be preset.

(3-3) Method Using Already Set Channel This case indicates that a channel connecting the three elements is preset. Each server arranged at a specific port of a cell exchange node is designated in advance. An operation check is performed in the boot operation.

(4) Case wherein Many VPI Servers and Many RT Servers exist in Network (4-1) Method Using Broadcast Channel This method is a scheme as a combination of the above two methods. The boot procedure is performed in the form of a combination of the above two methods.

(4-2) Method Using Metasignaling Channel

The RT server must be arranged to be directly accessed from a point at which the metasignaling channel is terminated. It is also possible to relay the metasignaling channel to access the RT server. The routing table for the three elements must be preset.

(4-3) Method Using Already Set Channel

This case indicates that a channel connecting the three elements is preset. Each server arranged at a specific port of a cell exchange node is designated in advance. An operation check is performed in the boot operation.

The boot procedure in the cell transmitter will be described below.

When the cell transmitter participates in a network, the cell transmitter performs the boot procedure. That is, prior to communication between a source cell transmitter and a destination cell transmitter, the source cell transmitter performs the boot procedure to the network, thereby setting the subsequent connection.

The boot procedure in the system of this embodiment basically includes acquisition of a VPI value as the access address of the cell transmitter and setting of a routing table for transferring cells in cell exchange nodes in a network. This procedure can be set manually by a network manager. In the following description, the above-mentioned servers, i.e., the VPI and RT servers perform address allocation and set the routing table of each cell exchange node.

The cell transmitter transfers a boot cell to the VPI server through a metasignaling channel, a broadcast channel, or a defined channel in booting. The boot cell is written with the physical and logic addresses of a cell transmitter to be booted. Upon the receipt of the boot cell, the VPI server assigns unused VPI in the network and notifies it to the cell transmitter. If no VPI to be assigned is available, the boot request is rejected.

The VPI server notifies VPI assignment and sends a routing table-set request of the cell exchange node to the RT server. The assigned VPI may be notified after or before the routing table-set completion message is received from the RT server. The VPI server receives the physical address (e.g., cell exchange node number+port number) of the cell exchange node whose boot request is allowed and sets routing table information for transferring cells from an arbitrary port except for the cell exchange node whose boot request is allowed in the network to the cell transmitter whose boot request is allowed. That is, the routing table is set such that a cell is transferred from the arbitrary port in the network to the cell transmitter assigned with the VPI number of the cell.

When the broadcast channel is used in the first boot cell transfer or the preset channel is used, the access channel to the VPI server can be changed to an arbitrary ATM connection. Upon booting the cell transmitter, the VPI server sends this information to a server which requires information updating. If an additional server which manages the address information of the network is present in addition to the VPI server, the necessary pieces of information, i.e., the physical address, ATM layer address, and network layer address of the booted cell transmitter, are sent to this additional server.

A procedure for moving a cell transmitter will be described below.

A procedure for booting a new cell transmitter to a network can be performed when the cell transmitter is moved. However, in this case, even if the cell transmitter is moved from a given port to another port, movement of the cell transmitter can be performed without almost changing information in another cell transmitter which is associated with the moved cell transmitter and the information in the moved cell transmitter to access this another cell transmitter. To realize this function, the cell transmitter or the VPI-assign server has at least one of the following functions.

(1) when the cell transmitter stores the VPI information used before the movement and is connected again in the network, acquisition of the VPI number used before the movement can be explicitly designated.

(2) The cell transmitter stores an identifier for causing the network to uniquely identify the cell transmitter. The network has a function of storing the corresponding VPI number information used before movement of this identifier. In connecting the cell transmitter again, the VPI number is assigned using this corresponding information in the same manner as the assignment before movement.

When the cell transmitter is to be moved, a procedure for notifying movement is performed, or the movement can be performed without this procedure. In the latter case, the network detects that a mobile terminal is away from a port in accordance with a monitoring means of the cell transmitter, a manual means, or a command input means.

The moved cell transmitter sends a boot cell from a destination port to the VPI server. Unlike in the first boot operation of the boot cell, the moved cell transmitter has been detected. The VPI server assigns the same VPI as used before and sends a cell routing table-set request of the RT server. In this manner, the moved cell transmitter and a cell transmitter except for the moved cell transmitter can resume communication without changing any VCI/VPI information required for communication.

The boot cell transferred to the VPI server in rebooting of the cell transmitter in a destination can be the same boot cell as used in booting the cell transmitter to the network for the first time. In this case, the VPI server has a function of detecting that the cell transmitter is the moved cell transmitter in accordance with cell transmitter identification information (e.g., an IP address) written in the boot cell.

Connection-setting procedures will be described below.

Figure 20:
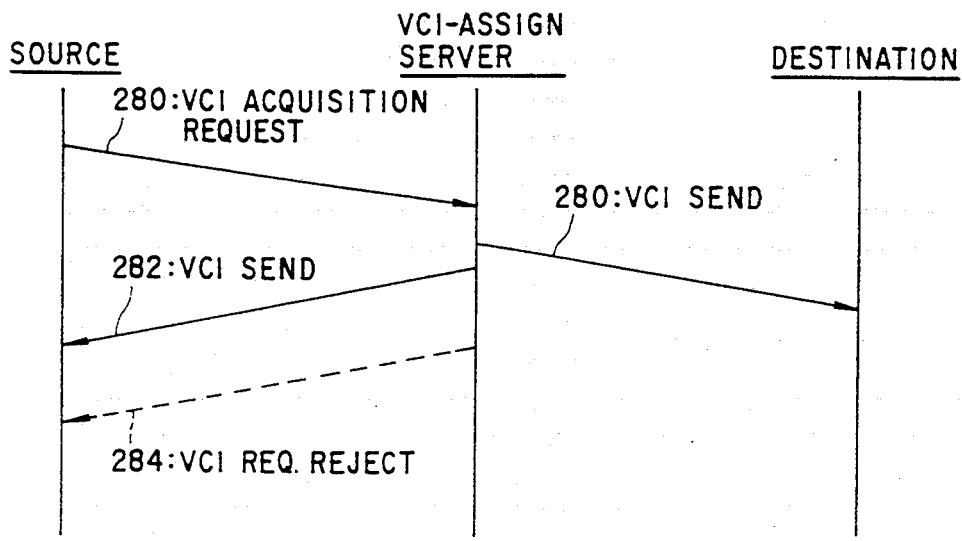
FIGS. 20 to 24 are diagrams showing several connection-setting procedures in accordance with embodiments of the invention.
Figure 21:
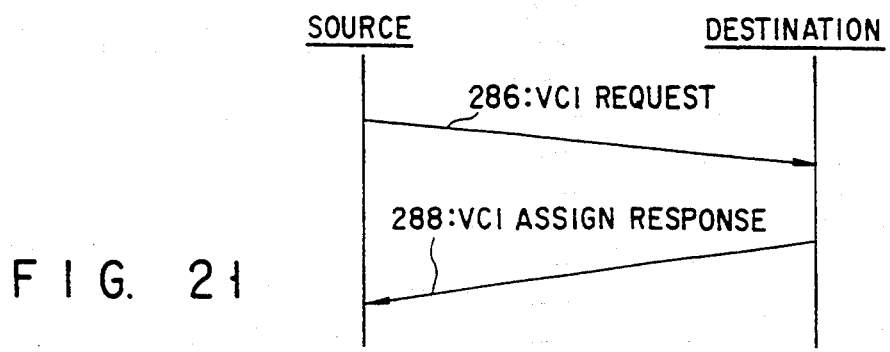
Figure 22:
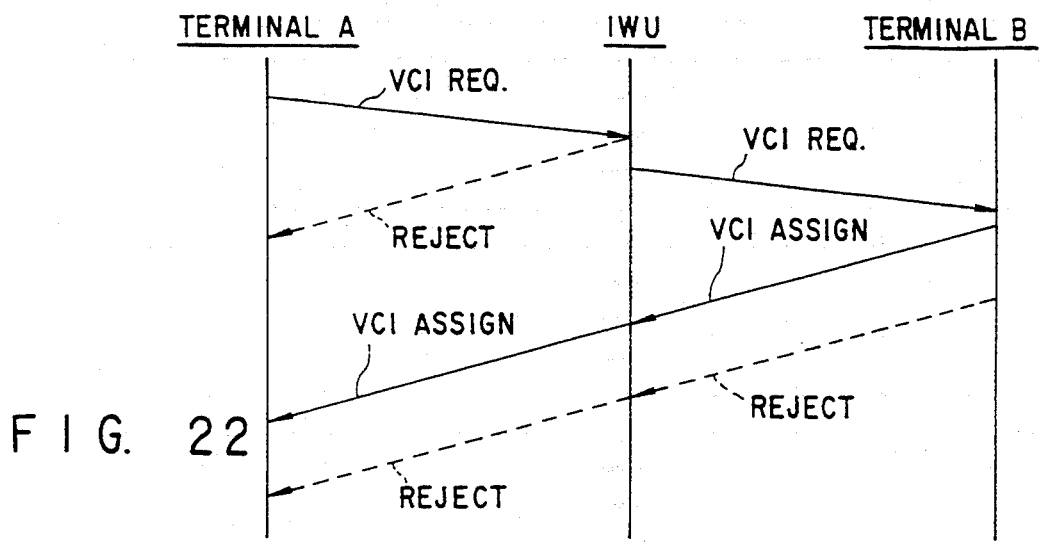
Figure 23:
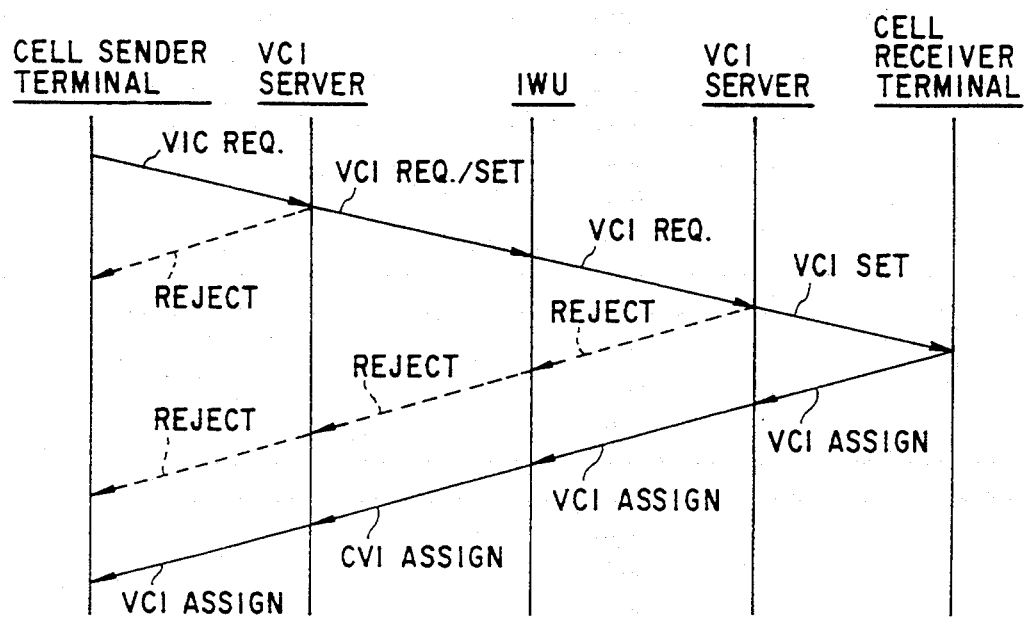

The connection-setting procedures are shown in FIGS. 20 to 24, wherein FIGS. 20 to 21 show the procedures for setting a connection in a network and FIGS. 22 to 23 show procedures for setting a connection between a plurality of networks. In this embodiment, cell routing is realized by VPI values, and the VPI values and a routing table are set in booting each constituent element. Therefore, each connection setting can be completed upon assigning a VCI value.

FIG. 20 shows an arrangement in which a VCI-assign/management server is present in a network. A network constituent element serving as a source terminal accesses a VCI-assign server in accordance with any one of the following methods: an ARP technique for acquiring a VPI of the VCI-assign server; or a metasignaling method.

The network constituent element (source terminal) transfers a VCI acquisition request message 280 to the VCI-assign server. Upon the receipt of the VCI acquisition request message, the VCI-assign server assigns a VCI, if possible, and transfers a VCI notifying message to the source terminal and the network constituent element serving as a destination station (see steps 280, 282). If the destination unit can reject connecting setting, the VCI notifying message 282 is transferred when the connection setting allowance notice is received from the destination terminal. If the destination terminal rejects the connection setting, the connection rejection message is notified to the source terminal through the VCI-assign server. Note that a preset VCI (e.g., VCI=0) for VCI assignment is required.

FIG. 21 is a task-flow diagram showing the procedures for setting a connection when a VCI-assign server is absent in the network or the VCI-assign server has been failed. The network constituent element serving as a source accesses the network constituent element serving as a destination in accordance with any one of the following methods: a method of acquiring the VPI of the destination terminal by the ARP technique; or a method of acquiring the VPI of the destination terminal using metasignaling.

The connection setting request, i.e., the VCI acquisition/assignment is performed between actual constituent elements in accordance with a VCI request 286 and a VCI-assign response (allowance or rejection) 288. In this case, a preset VCI (e.g., VCI=0) is required to assign a VCI.

FIGS. 22 and 23 show a task-flow diagram when an IWU is present between two terminals. If a server and an IWU must be acquired, the two methods described in association with FIG. 21 are available. To set a connection across two or more networks, the number of IWUs and VCI servers present between these networks is increased.

A method of acquiring a VPI will be described below. This VPI acquisition corresponds to an ARP (address acquisition protocol) in a data network (Ethernet) to obtain a physical address from the network address. The physical address in the ATM network corresponds to the VPI of the present invention.

The following two methods of acquiring VPIs are available.

(1) A method using a broadcast channel, which is a method of sending an ARP message in the network using a broadcast message. Methods of sending back a message in response to an ARP message include a method in which an ARP server sends back a message and a method in which the constituent element sends back a message. One of these methods may be used, or both the methods may be simultaneously used. In view of reliability, both the methods are preferably used simultaneously.

(2) A method using a metasignaling channel, which is a method of receiving a response from an ARP server using a metasignaling channel. The ARP server cooperates with a network management unit. The ARP server can be constituted as a master-slave system configuration to assure high reliability.

The constituent element which has sent an ARP request by means of an ARP request message acquires a VPI address. In this case, a protocol for acquiring not only the VPI address but also other physical addresses is preferably used. For example, in the first booting operation, even a VPI address is not assigned as described in the boot procedures of the network constituent elements. A protocol capable of acquiring not only a physical address except for the VPI but also, e.g., a host ID and the physical ID of a switch is preferably used.

A method of realizing the RARP will be described below. The RARP detects its own physical address, but is an address acquisition method when a network address is unknown. The method of realizing the RARP includes the following two methods.

(1) A method using a broadcast channel, which is a method of sending an RARP message in the network. The RARP server sends back a message in response to the RARP message.

(2) A method using a metasignaling channel, which is a method of receiving a message from the RARP server using a metasignaling channel. The RARP server cooperates a network management unit. The RARP server can be constituted as a master-slave system configuration to assure high reliability. A protocol capable of obtaining a VPI from not only a network address but also any other physical address must be used.

Emergency communication methods will be described below. These methods are mainly classified into the following methods.

(1) Communication Method When New VPI Is Not Assigned

Causes considered when a new VPI is not assigned are (a) the number of requests exceeding the set number of VP requests, (b) the failure of a VPI server, and (c) rejection of a routing table-set request from a VPI server due to some reason. The following cases are considered.

(1-1) Normal Routing Function of Cell, i.e., Normal VPI Table

In this case, communication between constituent elements already assigned with VPIs can be performed without posing any problem. In communication between a constituent element (to be defined as A) not assigned with a VPI and a constituent element (to be defined as B) assigned with a VPI, one-directional (B to A) communication can be normally performed, and communication in the opposite direction (A to B) is performed using a broadcast channel. Communication between constituent elements not assigned with VPIs is performed using a broadcast channel.

(1-2) Failure of Routing Function of Cell

In this case, if the broadcast channel is normal, communication can be performed using the broadcast channel.

(2) Communication Upon Failure of ARP Server

Communication can be performed because each constituent element has a response function to an ARP message. Note that it is assumed that the routing function is normal.

(2-1) Failure of Metasignaling Channel

In this case, a system is configured such that all the constituent elements can access a broadcast channel. The broadcast channel is used in place of the metasignaling channel.

Band assignment methods will be described below.

Band assignment can be performed by the following two methods.

(1) A VCI identifies a connection requiring band management from a connection without requiring band management. That is, since a connection requiring band management and a connection without requiring band management are mixed in the VPIs, the connection requiring band management can be identified from the connection without requiring band management.

(2) A connection requiring band management and a connection without requiring band management are managed by another VPI. That is, a connection requiring band management and a connection without requiring band connection are not present in one VPI.

The method using the VCI in (1) will be described below. When band assignment/management is performed by this method, the following server or module must be newly arranged in a network.

(a) Band Management/Assignment Server

This server sets a connection whose band is to be assured. That is, the VCI information of a connection subjected to bandwidth management and assigned with a band is managed to control necessary units/processors.

(b) VCI Read Module (input processing module of cell exchange node)

Since a cell exchange node requires VCI information in addition to VPI information, this module is required. A method of reading both VCI information and VPI information is also available.

(c) Buffering Policy Control Module

This module performs buffering policy control to perform cell transfer control for performing band management. As a method of realizing this control, a method of adding a tag to a buffering policy and a method of controlling a buffer itself are available.

(d) Buffer Priority Control Module (Input Buffer)

This module performs priority control and the like in an input buffer.

Figure 24:
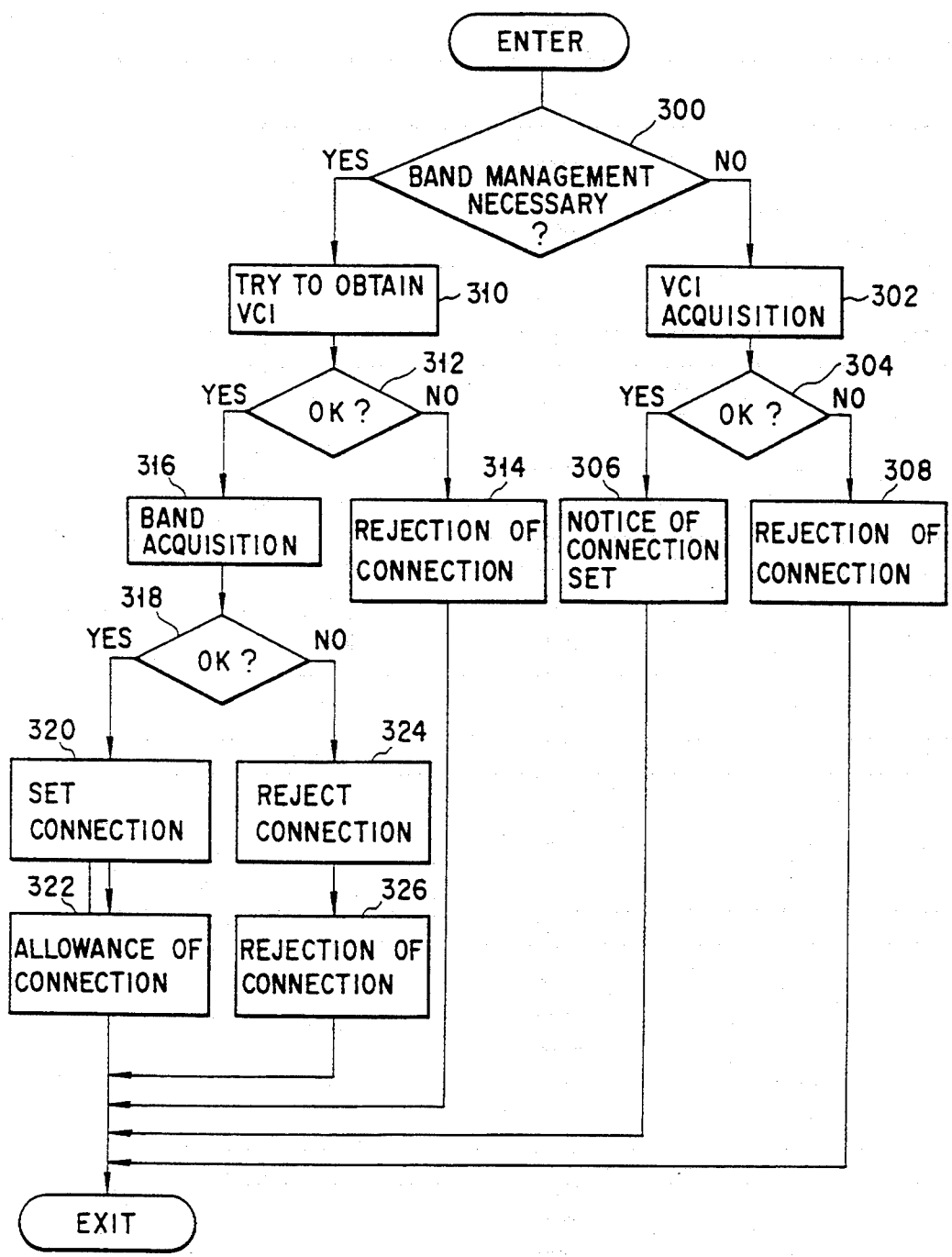

Connection-setting procedures having a case requiring band management and a case without requiring band management will be described with reference to FIG. 24. In setting a connection, at step 300 in FIG. 24, a network constituent element such as a source terminal reports whether band management is required. If NO, VCI acquisition is performed at step 302 in accordance with the above-mentioned procedures. It is checked at step 304 whether VCI acquisition is successful. If YES, the connection setting is notified at step 306. If NO, a message representing rejection of the connection is issued.

If YES at step 300, i.e., if band management is required, VCI acquisition is tried at step 310. At this time, the destination terminal or a server included in the network can assign and set a VCI. It is determined at step 312 whether VCI acquisition is successful or failed. If failed, rejection of the connection is notified at step 314. However, if successful, band acquisition is tried at step 316. It is determined at step 318 whether band acquisition is successful. If YES, i.e., if it is determined that band assignment can be performed along a route selected to allow data communication between the source and destination terminals, the VCI and the assigned bandwidth are registered in VCI identification tables in the data exchange nodes included in the selected route, thereby setting the corresponding connections. At step 322, a message representing that the connection setting is completed is issued. If NO at step 318, i.e., if band acquisition is impossible, the presently requested connection is rejected at step 324, and the assigned VCIs are released. At step 326, a connection rejection message is issued.

The recommendable example of the hardware configuration of an input control module for executing the above priority control is shown in FIG. 25, wherein VPI information and VCI information are required in cell transfer control.

As shown in FIG. 25, a VPI reader 340 is connected to a memory 342 for storing a routing tag (RT) table and a routing tag adder 344. A readout output from the RT memory 342 is transferred to the adder 344, and the RT is added to the cell transferred therein at this time. An output from the RT adder 344 is connected to a corresponding data exchange node or switch through a VCI reader 346 and an input buffer 348. The VCI reader 346 is connected to the buffer 348 through a buffering policy controller 350. With such an arrangement, VCI assignment must be appropriately performed to identify a VCI requiring band management from a VCI without requiring band management. The VCI reader 340 has VPI entries; and the buffering policy controller 350 has VCI entries. The controller 350 controls a buffering operation in the buffer 348 in accordance with a VCI input.

A priority control module shown in FIG. 26 is similar to that of FIG. 25 with (1) the VPI reader and the VCI reader 346 of FIG. 25 being integrated into a single circuitry 352 that performs the VPI- and VCI-read functions, and (2) the RT adder 344 and the buffering policy (BP) controller 346 of FIG. 25 being combined with each other to provide an RT-add/BP-control unit 354. The VPI/VCI reader 352 has functions of reading the VPI and the VCI. Therefore, the routing table memory 342 has VCI and VPI entries. An output from the table memory 342 is connected to the RT-add/BP control unit 354. This unit adds a routing tag and a tag necessary for executing a buffering policy to the cell and sends the resultant data to the input buffer 348.

A method using VPI information in band assignment will be described below. In band assignment and band management, a band assignment/management server and a buffer priority control module are newly added in the network. The first server sets a connection associated with band guarantee. That is, the first server manages the bandwidth to be assigned and controls units and/or processors required for managing the bandwidth. In order to perform transfer control of a cell for performing band management, the second server performs buffering control. The buffer priority control module includes an input buffer similar to the buffer 348 shown in FIG. 25 or 26 and performs priority control for the buffer.

The VPI-dependent band-management method includes an approach for assigning a VPI to a connection requiring band management in booting beforehand, and an approach for acquiring a VPI in setting a connection requiring band management. If the respective constituent elements such as terminals associated with the network are elements using connections requiring band management, at least two VPIs must be acquired in booting. Therefore, at least one or a plurality of VPIs must be prepared for a "connection with band management" requiring band management and a "connection without band management" not requiring band connection. Connection multiplexing can be realized using VCIs.

The connection-setting procedures without band management according to the approach for assigning a VPI in booting beforehand are shown in FIG. 27 as follows. A flow chart of these procedures is shown in FIG. 27. At step 360, VCI acquisition is tried. A VCI acquisition request at a source terminal is performed for a destination terminal; alternatively, this request can be made for one of ATM-LAN servers. At step 362, it is determined whether VCI acquisition is successfully performed. If NO at step 362, a message representing rejection of the connection is notified to the source terminal at step 364. If YES at step 362, band acquisition is tried at step 366. This band acquisition is performed by inquiring whether band assignment can be performed for a server in the network.

It is determined at step 368 whether band acquisition can be performed. If NO (setting is impossible), this connection is rejected at step 370, and the notice of rejection of the connection is issued to a requester. If YES (setting is possible) at step 368, this connection is set at step 374. At step 376, a message representing that the connection is set is notified to the source terminal as the requester. When the connection is to be set, the control management table of the input processing module arranged in the data exchange node or switch need not have VCI information because determination for the connection with band management or the connection without band management using a VPI can be sufficiently controlled on the basis of only the VPI information.

Connection-setting procedures according to the approach for acquiring a VPI in setting of a connection without band management will be described with reference to a flow chart in FIG. 28. At step 380, it is determined whether a source terminal or a destination terminal itself has a VPI for the connection with band management. If NO, VPI acquisition is tried at step 382. It is determined at step 384 whether VPI acquisition is possible. If NO (VPI acquisition is impossible), the connection setting request is rejected at step 386.

If YES (VPI is present) at step 380, VCI acquisition is tried at step 388. VCI acquisition at step 388 is also performed if YES (VPI acquisition is successful) at step 384. It is determined at step 390 whether VCI acquisition is successful or failed. If NO (fail), the connection setting is rejected at step 392. At step 394, a connection rejection message is issued. If YES (successful) at step 390, the subsequent steps are similar to those in FIG. 27. In this embodiment, when a connection is to be set, the control management table of an input processing module arranged in a data exchange node or switch need not have VCI information in the same reason as in the embodiment of FIG. 27.

The arrangement of the input processing module in the data exchange node or switch suitable for the control management method of this embodiment is shown in FIG. 29. This control module is similar to that of FIG. 26 with the VPI/VCI reader 352 of FIG. 26 being replaced with the VPI reader 340 of FIG. 25.

As described above, cell transfer control can be realized by only VPI information. Similarly, assigned VCI information need not be required in band management. That is, when a source VPI and a destination VPI of a connection of interest are known, the band management/ control server can determine a route through which the cell of the connection is transferred and can determine whether band assignment can be performed along this route.

Priority control will be described below.

Between various connections in the ATM-LAN according to the present invention, e.g., between a connection with band management and a connection without band management and between connections of the same type, priority differences are present concerning losses, delays, and other events. A CLP (cell loss priority) bit representing the cell loss priority, as is known well, is present in the header of the ATM cell. Priority control is performed by a CLP bit value in the header of the ATM cell in accordance with the CCITT recommendations. In the ATM-LAN, a plurality of usages of the CLP bit are allowed. One of the usages is priority control according to the CCITT recommendations, and the other is to positively use the CLP bit.

The priority differences in losses, delays, and other events are given to or superposed on part of the VPI and/or VCI field in the cell head to perform priority control. The purpose of use of each area is predetermined. If the purpose of use is to be changed, a bit for notifying the change all over the network as needed or representing the way of use of each area is arranged in part of the VCI field. Priority control for a connection different from priority control using only the CLP bit or for a setting of connections, further priority control, and a combination thereof can be performed.

As an example positively using the CLP bit, the CLP bit is set at 0 for a connection with band management and 1 for a connection without band management. In addition, to express priority differences concerning the losses, delays, and other events, a specific code number is given to or superposed on part of the VPI and/or VCI field in the cell header. As an example of a priority expression not positively using the CLP bit, in order to express the priority differences concerning the losses, delays, and other events, a specific code number is given to or superposed on the VPI and/or VCI field in the cell header. In this case, a cell transferred from a CCITT network uses the CLP bit complying with the CCITT recommendations, the CLP bit is directly evaluated by the network, or the content expressed by the CLP bit is coded in the VPI or VCI field by an internetwork connector, thereby receiving the code into the network.

In expressing the priority by giving or superposing a priority identification code to or on part of the VCI field, the priority identification code is assigned in the VCI field such that at least one specific bit is assigned in the VCI field for each of the losses, delays, and other events, or that the priority levels of the losses, delays, and other events are combined and coded, and the resultant code is assigned in the VCI field. In this embodiment, each priority level represented by the cell header is read by a cell exchange node or the like located in the transfer route of the local area network, and priority control is performed on the basis of the read result.

As an example using the VPI field in the ATM cell header, a plurality of VPIs are assigned to one destination so as to cope with the respective priority levels as in booting of the network system or addition of a cell transmitter (terminal). According to this method, in cell transfer to a given destination, a VPI value is set so as to correspond to the priority level of a corresponding connection, and the cell is output to realize the priority Control.

As a practical method of realizing these priority control operations, a method of giving a priority order to buffering in exchange elements such as cell exchange nodes or a method of establishing different routes in the network are available.

Figure 30:
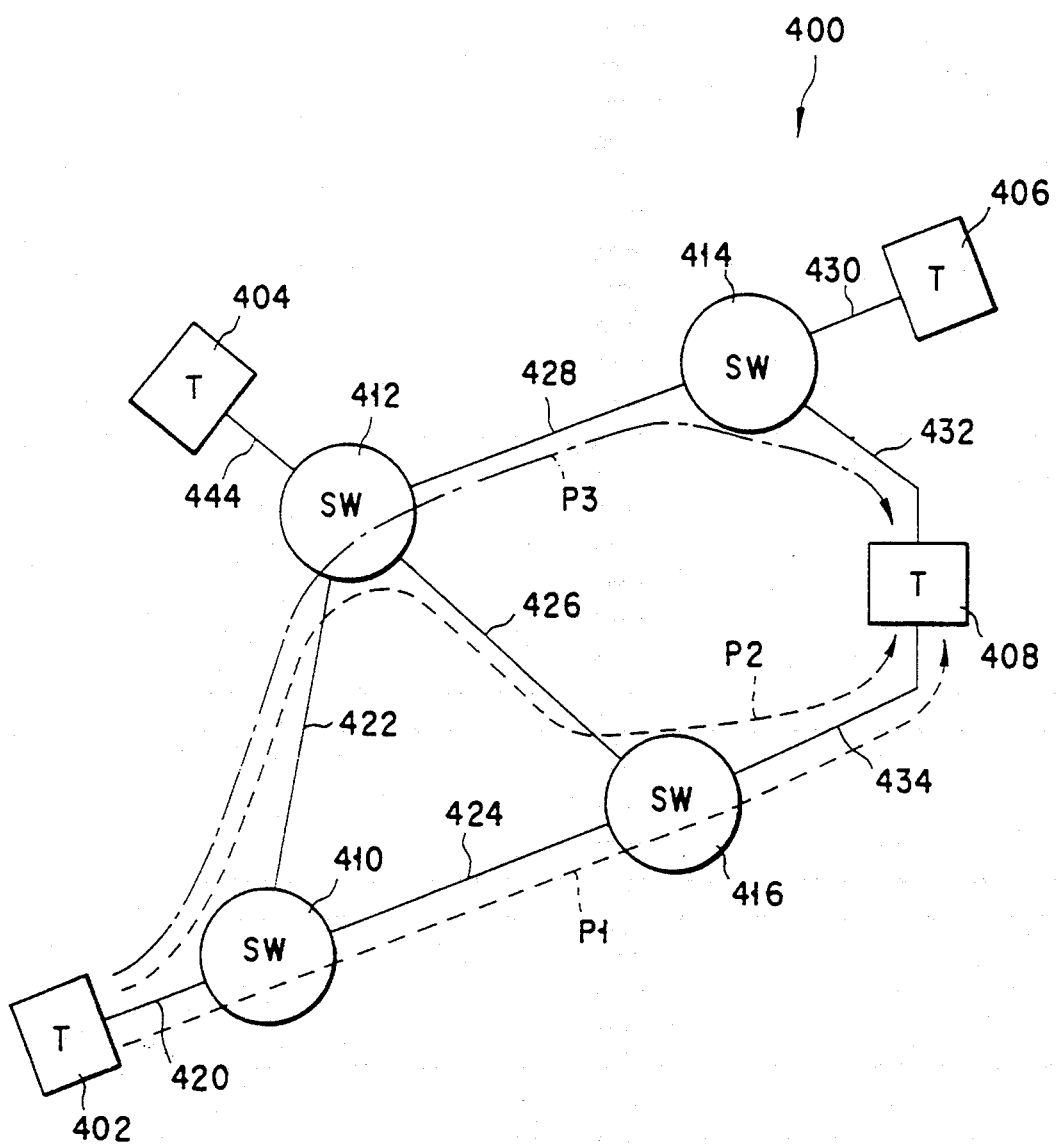
FIG. 30 shows an ATM-LAN in accordance with a further embodiment of the invention.

Routing control will be described below. FIG. 30 is a diagram showing a local area network 400 employing the control scheme in which a plurality of routes are present in the network. Reference numerals 402, 404, 406, 408 denote cell transmitters (terminals or connectors); 410, 412, 414, 416, cell exchange node ATM switches; and 420 to 434, lines for connecting the cell transmitters and the cell exchange nodes.

In this local area network, routing control is required to perform cell transfer through different routes to prevent congestion, perform priority control, and improve reliability in accordance with the purpose of this network. In this network, two types of routing control for performing passive route selection and positive route selection can be performed.

When the network changes and selects a route to prevent congestion or the like, passive routing control is performed, and its example will be described below. When the band of a route in setting a connection is occupied by another connection, and the network can set this connection due to the presence of at least one detour route, or when the band of the set route is subjected to congestion or set in the closed state, the transfer route of the cell can be changed.

With reference to FIG. 30, assume that a shortest route P1 along the lines 420, 424, 434 through the switches 410, 416 is set as a communication route in route setting from the cell transmitter 402 to the cell transmitter 408. If the communication route cannot be established due to the congestion of the line 424, this line 424 is bypassed by the lines 422, 426 through the switch 412, and a substituent route P2 is set by the routing control protocol. In VPI routing, a transfer route from a given source to a given destination, the transfer route is kept unchanged, and the changed route P2 is kept effective until the next change is made.

An example of positive routing control will be described below. Assume that the same route is present between cell exchange nodes through at least two cell exchange nodes under the condition that the cells of at least two connections are transferred from one source to the same destination, the condition that the cells of these connections are transferred from one source to different destinations, or the condition that the cells of these connections are transferred from different sources to one destination.

When the same route is used to transfer the cells of at least two connections, a routing control code is given to or superposed on part of the VCI field in the cell header so as to voluntarily change and select the route for congestion prevention, in order to perform load sharing. The change in route of the cell in the network is explicitly or implicitly expressed. A cell exchange node or the like on the route reads this change, thereby performing positive routing control for appropriately changing the route.

This will be described with reference to FIG. 34. Assume that a route P1 is set from the cell transmitter 402 to the cell transmitter 408.. In this case, a routing control code is given to or superposed on part of the VCI field so as to perform transfer through the route P2 in units of connections or cells, in order to share the load of the line 424. Alternatively, a routing control code is given to or superposed on part of the VCI field so as to perform transfer through a route P3 along the lines 422, 428, 432 through the switches 412, 414 in units of connections or cells, in order to share the load of the line 434.

In this manner, when positive routing control is employed in this network, the ATM switch in the network observes not only the VPI field but also the VCI field and performs a change in route in accordance with the routing control display bit of the VCI field.

Similarly, a routing control code is given to or superposed on part of the VCI field in the cell header to perform load sharing or voluntarily change or select the route in route setting to mainly improve reliability for a countermeasure against a failure in the route even if congestion does not occur on a common route of two or more connections, thereby explicitly or implicitly expressing the change in route of the cells in the network and hence performing positive routing control for causing a cell exchange node or the like on the route to read the routing control code to appropriately change the route.

A routing control code is given to or superposed on part of the VCI field in the cell header to change and select a route mainly for priority control having a more strict condition for a delay or loss than a connection except for at least one connection of at least two connections when these at least two connections pass through a common route, thereby explicitly or implicitly expressing the change in route of the cells in the network and hence performing positive routing control for causing a cell exchange node or the like on the route to read the routing control code to appropriately change the route.

On the other hand, a routing control code and the identification code of another identical cell are given to or superposed on the VCI field in the cell header to voluntarily change and select a route in connection setting so as to mainly improve reliability for a countermeasure against a failure midway along the route in such a manner that one connection transfers a plurality of identical cells from the same source to the same destination to obtain different transfer routes for the cells, and the destination selects one of the plurality of received identical cells, thereby explicitly or implicitly expressing the change in route of the cells in the network and hence performing positive routing control for causing a cell exchange node or the like on the route to read the routing control code to appropriately change the route.

A routing control code and an identification code of another identical cell are given to or superposed on the VCI field in the cell header to voluntarily change and select a route for a certain policy of the network except for congestion precision, reliability improvement, or priority control concerning several cells when at least two connections pass through a common route or at least one connection transfers a plurality of identical cells from the same source to the same destination, thereby explicitly or implicitly expressing the change in route of the cells in the network and hence performing positive routing control for causing a cell exchange node or the like on the route to read the routing control code to appropriately change the route.

Congestion control will be described below.

The ATM-LAN according to the present invention has a congestion control function of monitoring congestion of the network and alarming the congestion. This congestion control function can specify at least either the congestion position in the network or a connection or cell transmitter which causes the congestion. The congestion control function can notify congestion information to the cell transmitter or the like in the network. One congestion information notifying technique will be described below.

VPI and VCI values are not rewritten in the network in principle in accordance with an addressing scheme employed in the network according to the present invention. According to the embodiment, by using this, the VPI value of a connection present on a congested route, and a congestion information cell having the VPI value as a destination address is broadcast or multicast to notify that congestion has occurred in the destination.

As another method, the VCI values including source addresses in the respective connections are read at the congestion position, and a congestion information cell is sent to the respective sources.

As another method of confirming a source, a connection having a VPI value equal to the VPI value corresponding to congestion is searched at an upstream point from the congested line, thereby detecting a cell transmitter or the like which outputs connections multiplexed on the congested line. Various congestion preventive means can be executed by obtaining the congestion information as described above.

A charging system will be described below.

Using statistical information, it is possible to charge fees to each cell transmitter or subscriber in accordance with usage of network resources for a predetermined time interval or at an arbitrary time point. A connection amount observation function is provided to a source or destination to observe the VPI and VCI fields of each cell. When the cell amount observation function of the connection is provided to the source, the VPI fields of the output cells are read to specify the destination cell transmitter. Therefore, the connection amount can be observed between the source cell transmitter and the destination cell transmitter.

The connection amount is defined as an amount calculated on the basis of each connection type and a predetermined conversion coefficient or the like for each connection type. The connection amount does not simply imply the number of output cells. When the connection amount observation function is provided to the destination, the VCI field of the received cell is read to specify the source cell transmitter. Therefore, the connection amount can be observed between the source and destination cell transmitters. The statistical information observed in each cell transmitter can be notified periodically or at a desired time point.

When charging is performed for all the cells for each source cell transmitter, charging is performed in accordance with the connection amount observed by the connection amount observation function. As one method of charging fees to only a specific cell for each source cell transmitter, a charging cell identification code is given to or superposed on part of the VCI field to explicitly or implicitly express cell charging, and the connection amount observation function reads this charging cell identification code, thereby recording information required for charging. When all the cells are charged for each subscriber, a predetermined subscriber identification code is given to or superposed on part of the VCI field to explicitly or implicitly express the subscriber, and the cell is transferred. A connection amount observation unit reads the VCI value in the cell header to specify the subscriber who sends out the cell, thereby recording charging information for the subscriber.

when a specific cell is charged for each subscriber, a predetermined subscriber identification code and a charging cell identification code are given to or superposed on part of the VCI field to explicitly or implicitly express the subscriber and the charging cell. The connection amount observation unit reads the VCI value in the cell header to specify the subscriber who has sent out the cell, thereby recording the charging information for the subscriber. In this case, the usage charge of the subscriber in the network can be known such that charging collection requests are issued to the respective cell transmitters and responses from the respective cell transmitters are collected.

The internetwork connection function will be described below.

FIG. 31 is an embodiment of a method of connecting a network (standard network) employing a scheme different from that of the ATM-LAN and a cell transmitter (standard cell transmitter). Reference numeral 450 denotes the ATM-LAN; 452, a CCITT cell transmitter employing a scheme complying with the CCITT standards different from that of the ATM-LAN; 454, a connector for connecting different types of cell transmitters, i.e., for connecting the ATM-LAN 450 and the CCITT cell transmitter 452; 456, a public network (B-ISDN) employing a scheme complying with the CCITT standards different from that of the ATM-LAN; and 458, an internetwork connector for connecting the ATM-LAN 450 and the B-ISDN 456.

When communication from this network to another network or vice versa is to be performed, an internetwork connection function for connecting these two networks is required. This function is provided to the local area network.

The internetwork connection function is present in a network as a function of a unit independent of a terminal or cell exchange node which serves as a network constituent element or is shared or distributed into a plurality of network constituent elements to provide this function as an overall network.

Priority control, band management, and connection acceptance control which are unique to the network, and network control and management means such as routing control, congestion monitoring, and charging are converted into a scheme employed by the connected network or any other desired scheme to perform cell transfer to a network except for this network in accordance with the internetwork connection function. When cell transfer is to be performed to a network except for this network as an example of the function to be executed, connections are set up to the position of the internetwork connection function. The destination address of the internetwork connection function is assigned to the VPI field, and cell transfer is performed. The internetwork connection function performs operations in the ATM layer to rewrite VPI/VCI values into desired values if a destination has the same protocol as that of the source network or is an ATM network complying with the CCITT standards. Alternatively, the internetwork connection function performs operations in an upper layer than the ATM layer such that a network address is analyzed. In a network employing a transfer scheme except for the ATM scheme, a user information portion of a cell is extracted, and the extracted portion is organized into a desired packet or the like. In this manner, operations are performed in a protocol layer capable of performing translation between the protocols employed by the source and destination networks.

When a communication request is sent from an external network to this network, operations reverse to those described above are performed, and a connection is set from the internetwork connector to a desired terminal in the network.

Conversion of the VPI and VCI values in causing an independent network connector to connect this network to an external network will be described with reference to FIG. 21 again. The internetwork connector 458 is used to connect the external network 456 to the ATM-LAN 450. When a cell transmitter (source) having an address #6 in the ATM-LAN 450 tries to communicate with a cell transmitter (destination) in the external network 456, an apparent address.#4 is assigned to the destination terminal in the external network, and the source cell transmitter in the ATM-LAN uses the destination address #4 as the VPI value and #4 as the VCI value and outputs an ATM cell. The connection-setting procedures complying with the CCITT scheme have already been performed between the destination cell transmitter of the external network and the source cell transmitter of the ATM-LAN. Alternatively, the connection-setting procedures are performed at present. Values, i.e., VPI=#3 and VCI=#6 are given as connection identification codes. The VPI and VCI values of a cell sent from the source cell transmitter in the ATM-LAN 450 are updated to #3 and #6, respectively, and the resultant cell is sent to the external network 456.

In sending back a cell from the cell transmitter in the external network to the cell transmitter in the ATM-LAN 450, a cell sent from the terminal of the external network 456 has the same values, i.e., VPI=#3 and VCI=#6 as the incoming cell. The cell is sent to the internetwork connector 456 which has established the connection. Upon the receipt of the cell, the internetwork connector 458 stores the address of the target cell transmitter in the ATM-LAN 450, which is obtained upon sending the VPI and VCI values as the connection identification codes. For this reason, the internetwork connector 458 rewrites the VPI and VCI values to #6 and #5 and sends the updated cell to the ATM-LAN 450. By a series of operations described above, when the public network 456 complying with the CCITT scheme is connected to the ATM-LAN 450, the public network 456 detects the present state as if the same connection identification codes are used in one connection in both directions. The internetwork. Connector 458 has a function of connecting the networks of the same type, i.e., an ATM network as the destination network, and simultaneously a function of connecting the networks of different types, i.e., a non-ATM network as the destination network. When an apparatus including an internetwork connector has a plurality of addresses, a plurality of connection points with the external network can be assured.

when an address of the internetwork connector 458 is designated to cause the cell transmitter in the ATM network 450 to communicate with the external network 456, unused addresses of the plurality of addresses are detected, and one of the unused addresses is used to perform transfer. In this case, an unused address confirmation cell is transferred to an internetwork connector address management mechanism, and this address management mechanism transfers one of the unused addresses to specify a use address. As another example, the internetwork connector has continuous addresses in number as a power of 2. In this case, only the upper bits of the address field are designated, and the remaining lower bits are used to specify the internetwork connector.

In communication, the smallest one of these addresses is used as a representative address to transfer a cell to the internetwork connector in establishment of a connection, thereby assigning a usable address by the network interface of the internetwork connector. The representative address can be used until the end of communication. In this case, cells are transferred while the same destination address is written in the VPI field. The sender can be identified in accordance with the source address written in part of the VCI field.

As another example using a representative address, a cell using the representative address is transferred in the first access such as connection setting for the internetwork connector, the specified address is written in a response cell obtained by issuing a connection number or the like, and subsequent cell transfer can be performed using the specific address of the internetwork connector. When a plurality of addresses are present in one unit which is not limited to the internetwork connector, a communication address with this unit can be specified in the same operations as described above. Alternatively, priority levels are provided to a plurality of addresses assigned to the internetwork connector, and a priority identification code is given to or superposed on part of the VCI field in the cell head to explicitly or implicitly express the priority levels. The priority control in communication with the external network can be performed in accordance with the priority levels determined by the addresses as the VPI values. If an identifier or the like of the intra-network cell transmitter is absent in the message sent from the external network 456 to this network, this message is transferred from the internetwork connector to a predetermined cell transmitter or sent back to a source. Alternatively, the message is lost in the internetwork connector.

The connector for connecting terminals of different types will be described. It is possible to connect, e.g., a CCITT cell transmitter not employing the above control and management schemes as a network constituent element thorough a heterogeneous cell transmitter (terminal connector).

If the CCITT cell transmitter 452 in FIG. 31 is regarded as a CCITT terminal, this terminal must have the same VPI/VCI values of cells transferred in both directions in communication with another terminal or network. The addressing scheme employed by this network has different VPI/VCI values for a given connection, depending on the transfer direction. The heterogeneous cell transmitter connector 454 is arranged in the interface portion between the CCITT cell transmitter 452 and this network. The heterogeneous cell transmitter connector 454 stores the VPI/VCI values sent during cell transfer of the CCITT cell transmitter 452, and the destination address having the addressing scheme complying with this network is sent to the VPI field, and the VPI/VCI values are rewritten to assign the source address to the VCI field. The cell is then transferred to this network. A self-address of the heterogeneous cell transmitter connector is assigned in the cell sent back from the destination cell transmitter, and the address of the destination cell transmitter is assigned to the VCI field, thereby obtaining the VPI/VCI values of the cell for the CCITT cell transmitter, which correspond to the sent cell. In the heterogeneous cell transmitter connector, VPI/VCI values are rewritten to the above VCI/VPI values and sent back. The heterogeneous cell transmitter connector is arranged in the network interface such as the CCITT cell transmitter, thereby performing transfer as if bidirectional connections can be performed using the same VPI/VCI.

When a cell transmitter having an address #4 in the ATM-LAN 450 is to communicate with the CCITT cell transmitter 452, an apparent address #6 is assigned to the CCITT cell transmitter 452, and the VPI and VCI values of an ATM cell are set as #6 as the destination address and #5, respectively. The resultant ATM cell is sent out. The cell having the address issued to the CCITT cell transmitter is transferred to the cell transmitter connector 454. The CCITT connection-setting procedure between the connector and the CCITT cell transmitter has already been performed or is being performed at present. In connection setting, VPI=#2 and VCI=#1 are given as connection identification codes. The VPI and VCI values of a cell sent from the cell transmitter in the ATM-LAN are rewritten as #2 and #1, and the resultant cell is transmitted to the CCITT cell transmitter.

when a cell is to be sent back from the CCITT cell transmitter 452 to the cell transmitter in the ATM-LAN 450, a cell sent from the CCITT cell transmitter have the same VPI and VCI values, i.e., VPI=#2 and VCI=#1 as those of the incoming cell. The cell is sent to a cell transmitter whose connection is established. Upon the receipt of the cell, the connector 454 rewrites the VPI and VCI values to #4 and #7 because the connector 454 stores the cell transmitter address of the source ATM-LAN which is obtained upon transmission of the VPI and VCI values as the connection identifiers. The updated cell is then sent to the ATM-LAN.

Finally, this description will end up with an explanation of a method of cell transfer control in the ATM-LAN. FIG. 32 schematically shows the arrangement of an ATM-LAN in which the cell transfer control method to be disclosed hereinafter is implemented. In this ATM-LAN, data terminals 460, 462, 464, 466 acting as cell transmitters are interconnected together to a data cell exchange node or switch 648 by way of a corresponding number of communication lines 470 to 476, respectively. The terminal 464 is connected by a line 478 to a network 480. Another network 482 is interconnected by a line 484 to the switch 472.

In the ATM-LAN of FIG. 32, the VPI is defined as a service access point (SAP) of a destination terminal concerning this session. The destination SAP address, i.e., the VPI is uniform in the ATM-LAN. In cell transfer, the VPI is not rewritten by the switch 468. Since cell routing is performed using only the VPI information in the ATM layer header, the switch in the ATM-LAN may be regarded as a VP switch having no VPI rewrite function. The VCI is assigned as an identifier for identifying the SAP of a source terminal (cell transmitter). The VCI is not rewritten in the ATM-LAN. That is, in the ATM-LAN, both the VPI and the VCI are not rewritten at all in a route through any switch.

The cell transfer control method basically has the following five approaches. These approaches will be described in sequence. The first approach is to assign a destination address to the VPI field and cell transfer is performed using a VP cross-connection. In this case, the suitable format structure of a data cell is shown in FIG. 33A.

In the ATM-LAN of FIG. 32, assume that a connection request for an SAP of the terminal 466 occurs in a certain SAP of the terminal 460. If UNI cells are used, the source terminal 460 sets an 8-bit SAP identification parameter (SAP-ID) as destination address information for identifying the SAP of the destination terminal 466, in the VPI field in the header of the ATM cell. Alternatively, when NNI cells are used, the source terminal 460 sets a similar 12-bit SAP-ID as destination address information in the VPI field of the header of the cell. In either case, the data cell uses all or part of the band of the line 470 and is transferred to the switch 468 in the form of an ATM cell.

In the cell exchange node 468, the ID set in the VPI field of this cell is read and transfers this cell to the terminal 466 without changing its VPI information using all or part of the band on the line 476 serving as the corresponding output line associated with the destination terminal 466. That is, in the cell exchange node 468, the VPI in the cell header is not rewritten. This is equivalent to a case wherein a Permanent VP (PVP) is set on the lines 470, 476 for connecting the SAP in the source terminal 460 and the SAP in the destination terminal 466.

These connections are set/confirmed in booting an ATM system or cell transmitter. For example, address allocation is manually written, or an address server for issuing an address allocates the addresses in a cell transmitter which receives the addresses. In addition to addressing for identifying a single SAP, group and broadcast addresses are defined to realize multicast and broadcast communications.

When the number of terminals exceeds the number of terminals in the ATM switch system network or the number of SAPs exceeds an expressible number of SAPs in the VPI field as the destination address generator, the address of a certain source cell transmitter or a destination cell transmitter unique with respect to the SAP, or a destination cell transmitter unique with respect to a switch is translated into an SAP address in an ICM of cell exchange node. A desired ID, e.g., some of port numbers used in identification for connections between processes in a transport layer or an ID for source SAP identification may be set in 10 bits of an MID field of, e.g., an AAL type ⅔ (see FIG. 33B).

A VPC set function at the time of request can be provided using a signaling procedure to set a connection from an external network. A plurality of IDs are assigned to the respective SAPs in advance, and an SAP ID used for establishing a connection using the signaling procedure and an ID used for operations at lower levels can be selectively used. In the signaling procedure or an operation except for this, the contents of the routing table are rewritten to realize one-to-plurality, plurality-to-one, and plurality-to-plurality connections in addition to a one-to-one connection.

All or part of a 16-bit VCI field can be used in use of UNI and NNI cells in accordance with a usage determined or negotiated between the source and destination transmitters, a usage determined in a switch system, or definitions of combinations of one or a plurality of types of codes defined by application software running in the LAN constituent unit. Application examples of the set IDs are an SAP ID, a priority ID (e.g., a response request), an ID having a meaning of a subaddress which cannot be expressed as a destination address in the VPI field, a request delay display ID, a group transmission display ID, an ID for identifying cell multiplex in an ATM layer, a single cell order description, and a combination of cell order descriptions.

The second approach of cell transfer control will be described as follows. A difference of this approach from the previous approach lies in that entire VPI/VCI field is assigned with destination addresses and the source identifier is set in the header of a host protocol in the second method. A cell format is shown in FIG. 33C.

If connection setting is required in the SAP of the terminal 460 of FIG. 32 for the SAP of the destination terminal 466, the terminal 460 sets a 24-bit SAP ID of the destination terminal 466 in the VCI/VPI field in the header of the ATM cell when the UNI cells are used. However, when the NNI cells are used, the terminal 460 sets a similar 24-bit SAP ID as destination address information in the VCI/VPI field in the cell header. The terminal 460 sends the cell to the cell exchange node 468 using all or part of the band on the line 476.

The cell exchange node 468 reads the ID set in the VCI/VPI field of this cell and transfers the cell to the terminal 466 without rewriting the VCI/VPI information using all or part of the band on the line 476 serving as a corresponding output line. That is, the VCI/VPI in the cell header is not rewritten (converted) in the cell exchange node 468. This is equivalent to a case wherein the PVP/PVC values are set on the lines 470, 476 for connecting the SAP of the source terminal 460 and the SAP of the destination terminal 466.

The set/confirmation of these connections in booting the ATM system or cell transmitter and realization of multicast and broadcast communications are the same as in the first method.

In the procedures of this method, since only a one-way connection is established between the SAPs, an ID for recognizing the source is set in the header portion of the host protocol. For example, a 10-bit MID field in the header of, e.g., the AAL type ⅔ can be set as information for identifying the source (see FIG. 33B). This set ID may be an ID having the same relationship as part of the SAP ID serving as the destination address or any ID independent of the SP ID. A portion representing the priority such as a response request in place of the SAP ID can be defined in the ID. To set a connection from an external network, a function of setting the VCC/VPC at the time of request can be provided using the signaling procedure. In the signaling procedure or an operation except for this, the contents of the routing table are rewritten to realize one-to-plurality, plurality-to-one, and plurality-to-plurality connections in addition to a one-to-one connection as in the first method.

The third method for cell transfer control will be as follows. According to this method, a destination address is assigned to the VPI field, and cell transfer exchange is performed using a VP cross-connection as in the first method. A cell format is shown in FIG. 33A.

A difference of the third method from the first method lies in that an ID for recognizing the source is set in a 16-bit VCI field in use of UNI cells and that part or all of a similar 16-bit VCI field is used to set the ID for recognizing the source in use of NNI cells. This set ID may be an ID having the same relationship as part of the SAP ID serving as the destination address or any ID independent of the SAP ID.

For example, when the UNI cells are used, a destination address is set in 8 bits of the VPI field, the source address is set using 8 bits of the VCI field, and other IDs are set in the remaining 8 bits of the VCI field. For example, some port or process numbers used for connections between the processes in the transport layer as the host protocol or any other identifier can be set in the remaining 8 bits (see FIG. 33C).

As another example, when the UNI cells are used, a destination address is set in 8 bits of the VPI field, and a source address is set in 16 bits of the VCI field. As still another example, when the NNI cells are used, a destination address is set in 12 bits of the VPI field, and a source address is set in 12 bits of the VCI field. A portion representing the priority such as a response request in place of the SAP ID and an ID having a meaning of a subaddress which cannot be expressed as a destination address in the VPI field can be described in part of the ID.

A difference of the fourth method for cell transfer control from the second method lies in that VCI/VPI values corresponding to the respective connections are set. When a connection of the SAP of the source terminal 460 of FIG. 32 for the SAP of the destination terminal 466 is required, an address representing a connection relationship between the SAPs of the terminals 460, 466 and included in the address (this address is a 24-bit address for the UNI cell or a 28-bit address for the NNI cell) serving as a predefined ID representing the SAP connection relationship is set in the VCI/VPI field of the ATM cell header in all or part of the ATM cell exchange system network. The cell is sent to the cell exchange node 468 using part or all of the band on the line 470. The process of the cell exchange node 468 is the same as in the second method.

Since an address is assigned as an ID representing a connection relationship between arbitrary SAPs, the ID can be used not only in one-way connection but also in bidirectional communication. Setting/confirmation of these connections in booting the ATM system or cell transmitter is the same as in the first method. Multicast communication and broadcast communication can be realized as in the first method. In addition, some IDs can express not only the connection relationship but also additional information such as a cell transfer delay and priority (e.g., a cell loss priority), thereby effectively utilizing the VPI/VCI field. An unused address as an inter-SAP connection ID is used to set a new connection relationship ID in the VCI/VPI field to establish a connection in response to a connection request from a cell transmitter except for the ID-set cell transmitter and an SAP except for an ID-set SAP in the ID-set cell transmitter.

In the fifth method for cell transfer control, a destination identifier uniquely defined in a source SAP is set in the VCI/VPI field, and cell transfer and exchange are performed. The cell exchange node has a VCI/VPI conversion function. A cell format is shown in FIG. 33E.

If a connection of the SAP of the source terminal 460 in FIG. 32 for the SAP of the destination terminal 466 is required, an address representing a connection relationship with the SAP of the destination terminal 466 which is uniquely defined in the SAP of the terminal 460, which address is expressed as a 24-bit address for the UNI cell or a 28-bit address for the NNI cell, is set in the VPI/VCI field. The cell is sent to the cell exchange node 468 using part or all of the band on the line 470. The operation of the cell exchange node 468 is the same as in the second method.

The setting/confirmation of these connections in booting the ATM system or cell transmitter and realization of multicast and broadcast communications in the fifth method are the same as in the first method. Some IDs can express not only the connection relationship but also additional information such as a cell transfer delay and priority (e.g., a cell loss priority), thereby effectively utilizing the VPI/VCI field as in the fourth method. An unused address as an inter-SAP connection ID is used to set a new connection relationship ID in the VCI/VPI field to establish a connection in response to a connection request from a cell transmitter except for the ID-set cell transmitter and an SAP except for an ID-set SAP in the ID-set cell transmitter as in the fourth method.

The present invention is not limited to the above-described specific embodiments and may be practiced or embodied in still other ways without departing from the spirit or essential character thereof.

What is claimed is:

1. An asynchronous transfer mode network adapted to be associated with a plurality of data terminals, said network comprising:

a plurality of data exchange nodes;

a plurality of data transfer links interconnecting said data exchange nodes so that said terminals are connected by corresponding data links associated therewith to said data exchange nodes in said network;

means for selectively establishing in said network a virtual circuit over which a series of data packets including one or a plurality of coded cells are routed from at least one source terminal toward at least one destination terminal, each of said cells having an information field and a header section; and said means (i) writing, when a cell is transferred from said source terminal to said destination terminal along a presently determined route including selected links associated with a certain data exchange node or nodes, a specific identification parameter being uniform in said network and assigned to said destination terminal into the header section of the cell, and (ii) causing the cell to be transferred to said destination terminal on the basis of the specific identification parameter without changing said specific identification parameter at said certain data exchange node or nodes.

2. The network according to claim 1, wherein each of said data exchange nodes includes:

a cell switch having one or a plurality of inputs and one or a plurality of outputs;

input processor means arranged at said inputs of said cell switch, for receiving a cell having a virtual channel identification parameter and a virtual path identification parameter, which are included in said specific identification parameters, in its header section, for supplying a corresponding one of said inputs of said cell switch with a cell that has in its header section a parameter indicative of a routing header information being temporarily written into the header section of the cell together with said virtual channel identification parameter and said virtual path identification parameter without changing; and output processor means arranged at the outputs of said cell switch, for receiving the cell supplied thereto, and for supplying the cell to a corresponding one of the selected data links associated therewith while said routing header is deleted therefrom.

3. The network according to claim 2, wherein said input processor means includes:

memory means for storing therein the specific identification parameters within said network and a conversion table information between routing tags added to said cell and which are effective only at a corresponding cell exchange node; and control means for reading out a specific identification parameter of an input cell to said input processor means assigned to said destination terminal, for retrieving said conversion table information to extract a corresponding appropriate routing tag parameter therefrom, and for adding the extracted routing tag parameter to the header section of the input cell.

4. The network according to claim 3, wherein said input processor means further includes:

cell buffer means for receiving the input cell, and for storing it prior to transmission over its associated data link.

5. The network according to claim 1, wherein said means comprises:

identification number assignment means for, when a certain terminal is connected to said network through its interface, acquiring and assigning a certain identification number as a specific identification parameter therefor.

6. The network according to claim 5, wherein said means further comprises:

routing table setting means provided in said data exchange nodes, for storing therein a routing information table, and for, upon receipt of a cell written with said certain identification number, setting said routing information table so as to allow the cell to be transmitted toward at least one destination terminal as presently designated.

7. The network according to claim 1, further comprising:

another network having a plurality of data links interconnecting a plurality of data terminals therein; and network connector means for allowing said asynchronous transfer mode network to be connected to said another network, said network connector means detecting, when a data is transferred from one of said asynchronous transfer mode network and said another network to the other of them along a selected route, the specific identification parameter concerning a selected routing associated with a cell transferred to said network connector means, writing or converting the identification parameter into a corresponding parameter adaptable for said other of said asynchronous transfer mode network and said network system including a destination terminal, and sending out said cell together with the converted parameter.

8. The network according to claim 7, wherein each of said terminal is assigned with a virtual channel identification parameter and a virtual path identification parameter, and said network connector means comprises:

cell buffer means having at least one input and at least one output, for receiving and storing said cell prior to transmission out of said cell buffer means; memory means for storing a conversion table between presently available virtual channel identification parameters and virtual path identification parameters with respect to said asynchronous transfer mode network and said another network; and routing control means connected to said cell buffer means and said memory means, for reading a routing information out of a header section of said cell, for determining a converted routing information adapted for said other of said asynchronous transfer mode network and said another network in accordance with the read routing information using said conversion table, and for sending forth externally the converted routing information being added to said cell.

9. The network according to claim 7, wherein each of said terminal is assigned with a virtual channel identification parameter and a virtual path identification parameter, and said network connector means comprises:

cell buffer means having at least one input and at least one output, for storing said cell prior to transmission therefrom;

memory means having a plurality of independent memory spaces, each of which stores a conversion table between presently available virtual channel identification parameters and virtual path identification parameters with respect to said other of said asynchronous transfer mode network and said another network; and routing control means connected to said cell buffer means and said memory means, for selectively using one of said memory spaces in accordance with a type of a presently requested communication connection, for reading a routing information being present in a header section of said cell, for accessing the selected one of said memory spaces in accordance with the read routing information to determine a converted routing information and an optimum cell-buffering scheme which are adapted for said other of said asynchronous transfer mode network and said another network, and for sending forth externally said cell being buffered in accordance with said optimum buffering scheme while causing said cell to be added with the converted routing information.

10. A packet-oriented data communication network system comprising:

(a) a plurality of asynchronous transfer mode (ATM) networks each of which is associated with a plurality of data terminals, each comprising, a plurality of data exchange switches, a plurality of data transfer links interconnecting said switches so that said terminals are connected by corresponding data links associated therewith to said switches in each ATM network, means for selectively establishing within said network a virtual circuit over which a series of data packets including one or a plurality of coded cells are routed from a cell transmitter terminal toward a cell receiver terminal, each of said cells having an information field and a header field, said means (i) writing, when a cell is transferred between the transmitter and receiver terminals along a presently determined route including selected links associated with certain switch or switches, a specific identification parameter being uniform in said network and assigned to said receiver terminal into the header field of the cell, and (ii) causing the cell to be transferred to said receiver terminal on the basis of the specific identification parameter without rewriting or converting said specific identification parameter at said certain switch or switches; and (b) network connector devices connecting said ATM networks to one another by data transmission lines in a bidirectionally communicative manner, said network connector devices rewriting or converting, when a request is made to transfer a data cell from at least one of said ATM networks to at least one target network along a presently determined network-to-network route including at least one selected network connector device, said specific identification parameter so as to be adapted for said target network when the data cell passes through said selected network connector device.

11. The network system according to claim 10, further comprising:

means for converting a connection identification parameter to be written into the header field of a cell to be transferred between the at least one ATM network and said target network in accordance with a type of connection in a presently requested data transfer.

12. The network system according to claim 11, further comprising:

routing control means for performing routing control operations independently of one another with respect to types of connections between said ATM networks.

13. The network system according to claim 10, further comprising:

means for causing said network connector devices to select said network-to-network route independently of selection of said presently determined route inside the at least one ATM network.

14. A data cell routing method for use in an asynchronous transfer mode network, said ATM network comprising a plurality of data links interconnecting a plurality of network switches, and a plurality of terminals connected by data links associated therewith to said switches in said ATM network, said terminals being assigned with identification parameters uniform in value within said network, said method comprising the steps of:

selectively establishing in said ATM network a virtual circuit over which a series of data packets including one or a plurality of coded cells is routed from at least one source terminal toward at least one destination terminal, each of said cells having an information field and a header section;

writing, when a cell is transferred from the source terminal to the destination terminal along a presently determined route including selected links associated with certain data exchange node or nodes, a specific identification parameter assigned to said destination terminal into the header section of the cell; and transferring said cell to said destination terminal on the basis of the specific identification parameter without rewriting or converting said specific identification parameter at a certain data exchange node or nodes in the presently determined route.

15. The method according to claim 14, wherein, when said cell is sent forth from said ATM network toward another network connected with said ATM network, said specific identification parameter is rewritten or converted in value to be adaptable for said other network.

16. A connection setting method for use in an asynchronous transfer mode network, said ATM network comprising a plurality of data links interconnecting a plurality of network switches, each of said data links having a bandwidth, and a plurality of terminals connected by data links associated therewith to said switches in said ATM network, said method comprising the steps of:

acquiring, when at least one of said terminals is booted, a virtual path identification parameter for routing that allows the booted terminal to perform a data cell transmission to or from another terminal included in said ATM network;

causing said ATM network to set a conversion table between a virtual path identification parameter and a routing tag information to be referred to attain the virtual path identification parameter oriented routing; and setting a connection on the basis of at least one of acquisition of the virtual path identification parameter and negotiation between said at least one terminal and said another terminal.

17. The method according to claim 16, wherein, when said connection is a first kind of connection without a request for band management, the setting of connection is performed by transferring a cell to said another terminal, and by causing said another terminal to assign a virtual path identification parameter as a connection identification number.

18. The method according to claim 16, wherein when said connection is a second kind of connection with a request for band management, the setting of connection is carried out by permitting a server for performing a band assignment to join, and by causing, after a virtual path identification parameter as a connection identification number is acquired, at least one of said at least one terminal and said another terminal to verify whether a band assignment is possible for said ATM network under the control of said server.

19. A connection setting method for use in an asynchronous transfer mode network, said ATM network comprising a plurality of data links interconnecting a plurality of network switches, each of said data links having a bandwidth, and a plurality of terminals connected by data links associated therewith to said switches in said ATM network, said method comprising the steps of:

acquiring, when at least one of said terminals is booted, a virtual path identification parameter for routing that allows the booted terminal to perform a data cell transmission to or from another terminal included in said ATM network;

causing said ATM network to set a conversion table between a virtual path identification parameter and a routing tag information to be referred to attain the virtual path identification parameter oriented routing;

setting a connection on the basis of at least one of acquisition of the virtual path identification parameter and negotiation between said at least one terminal and said another terminal is possible for said ATM network under the control of said server; and wherein said connection is a second kind of connection with a request for band management, the setting of a connection is carried out by permitting a server for performing a band assignment to join, and by causing, after a virtual path identification parameter as a connection identification number is acquired, at least one of said at least one terminal and said another terminal to verify whether a band assignment is possible for said ATM network under the control of said server.

* * * * *

UNITED STATES PATENT AND TRADEMARK OFFICE
CERTIFICATE OF CORRECTION

PATENT NO. : 5,440,547
DATED : August 8, 1995
INVENTOR(S) : Hiroshi ESAKI, et al.

It is certified that error appears in the above-indentified patent and that said Letters Patent is hereby corrected as shown below:

On the title page, Items [19] and [75], the first inventor's last name should read:

[19] --Esaki et al.--

[75] --Esaki--

Signed and Sealed this

Thirty-first Day of October 1995

*Attest:*

BRUCE LEHMAN

*Attesting Officer*     *Commissioner of Patents and Trademarks*